(12) United States Patent
Hochstetter et al.

(10) Patent No.: US 12,173,129 B2
(45) Date of Patent: Dec. 24, 2024

(54) FIBROUS MATERIAL IMPREGNATED WITH THERMOPLASTIC POLYMER OF OPTIMUM MOLECULAR MASS AND VISCOSITY AND METHOD FOR THE PRODUCTION THEREOF

(71) Applicant: Arkema France, Colombes (FR)

(72) Inventors: Gilles Hochstetter, Colombes (FR); Lise Deves, Serquigny (FR); Mathieu Capelot, Serquigny (FR); Thierry Briffaud, Serquigny (FR); Yves Deyrail, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 447 days.

(21) Appl. No.: 17/416,098

(22) PCT Filed: Dec. 17, 2019

(86) PCT No.: PCT/FR2019/053112
§ 371 (c)(1),
(2) Date: Jun. 18, 2021

(87) PCT Pub. No.: WO2020/128296
PCT Pub. Date: Jun. 25, 2020

(65) Prior Publication Data
US 2022/0081520 A1  Mar. 17, 2022

(30) Foreign Application Priority Data

Dec. 20, 2018  (FR) ...................... 1873604

(51) Int. Cl.
C08J 5/04  (2006.01)
(52) U.S. Cl.
CPC ........... C08J 5/042 (2013.01); C08J 2377/10 (2013.01)

(58) Field of Classification Search
CPC ....... C08J 5/042; C08J 2377/10; B29B 13/00; B29B 15/12; B29C 70/20; B29K 2101/12; B29K 2307/04
(Continued)

(56) References Cited

U.S. PATENT DOCUMENTS

2014/0005331 A1  1/2014  Johnson et al.
2017/0037208 A1*  2/2017  Hochstetter .............. C08J 5/243
(Continued)

FOREIGN PATENT DOCUMENTS

WO  WO-2011015790 A2 *  2/2011  ............. C08G 69/14
WO  2012066241 A2  5/2012
(Continued)

OTHER PUBLICATIONS

Anonymous, "Glass Transition Temperatures", Polymer Properties Database, Jan. 2015 (Jan. 1, 2015), Retrieved from the Internet: http://polymerdatabase.com/polymer%20physics/Polymer%20Tg.html, XP055626574, 6 pages.
(Continued)

Primary Examiner — Camie S Thompson
(74) Attorney, Agent, or Firm — Boone IP Law

(57) ABSTRACT

The present invention concerns an impregnated fibrous material comprising at least one continuous-fiber fibrous material in the form of a roving or a plurality of parallel rovings and at least one thermoplastic polymer matrix, characterized in that said at least one thermoplastic polymer is an amorphous or semi-crystalline polymer having a glass transition temperature such that Tg≥40° C., especially Tg≥100° C., in particular ≥120° C., the fiber content of said impregnated fibrous material being from 45 to 65% by volume, preferably from 50 to 60% by volume, especially from 54 to 60% by volume, the number-average molecular mass Mn of said thermoplastic polymer being from 11,000
(Continued)

to 25,000 g/mol, the melt viscosity of said thermoplastic polymer being from 80 to 1500 Pa·s, as measured by plane-plane rheology at 1 Hz and 2% deformation, at a temperature of Tg+220° C.

37 Claims, 3 Drawing Sheets

(58) Field of Classification Search
USPC .................................................... 428/297.4
See application file for complete search history.

(56) References Cited

U.S. PATENT DOCUMENTS

| | | | |
|---|---|---|---|
| 2018/0162069 A1* | 6/2018 | Matsumoto | B29C 43/20 |
| 2018/0171075 A1* | 6/2018 | Tsunaka | C08G 69/32 |

FOREIGN PATENT DOCUMENTS

| | | | |
|---|---|---|---|
| WO | WO-2015121583 A2 * | 8/2015 | ............... B05D 1/18 |
| WO | 2016062896 A1 | 4/2016 | |
| WO | 2018011493 A1 | 1/2018 | |
| WO | 2018115737 A1 | 6/2018 | |

OTHER PUBLICATIONS

International Search Report (PCT/ISA/210) with translation and Written Opinion (PCT/ISA/237) mailed on Apr. 8, 2020, by the European Patent Office as the International Searching Authority for International Application No. PCT/FR2019/053112.

Mayer, et al., "Macro- and micro-impregnation phenomena in continuous manufacturing of fabric reinforced thermoplastic composites", Composites Part A, vol. 29, No. 7, Jul. 1998 (Jul. 1, 1998), pp. 783-793.

* cited by examiner

[Fig. 1]
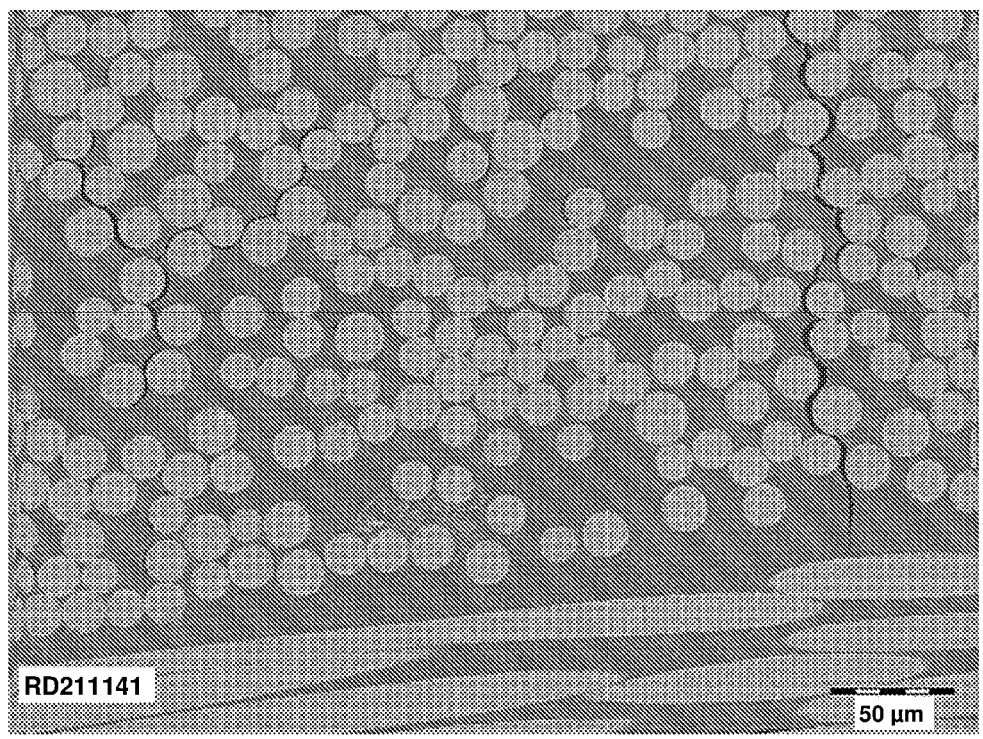
[Fig. 2]
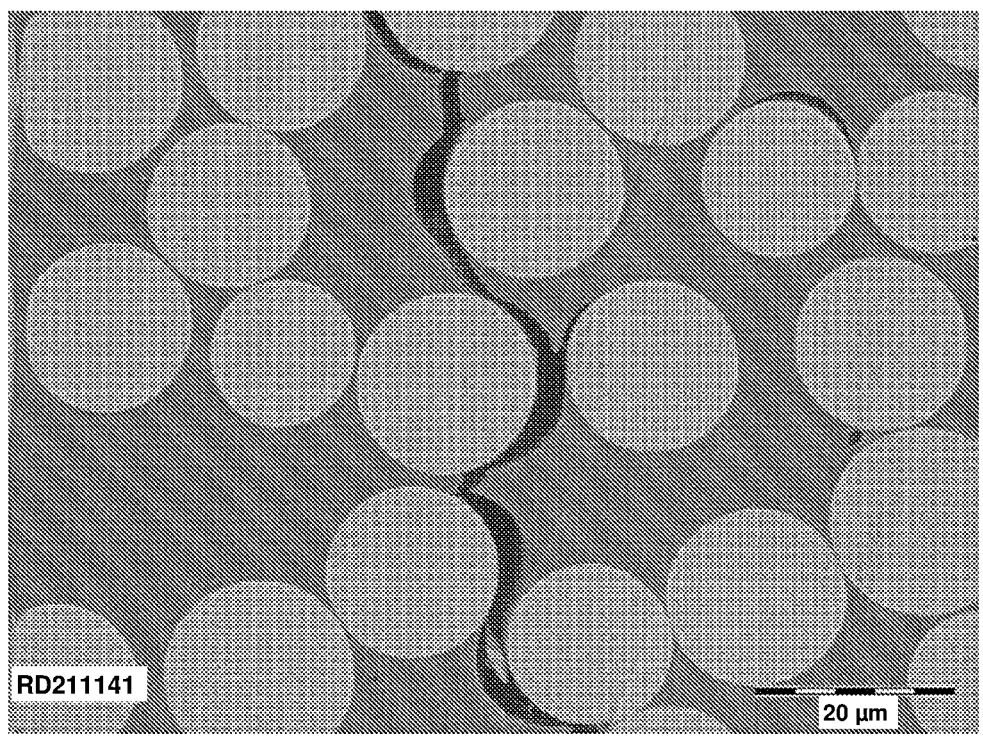

[Fig. 3]
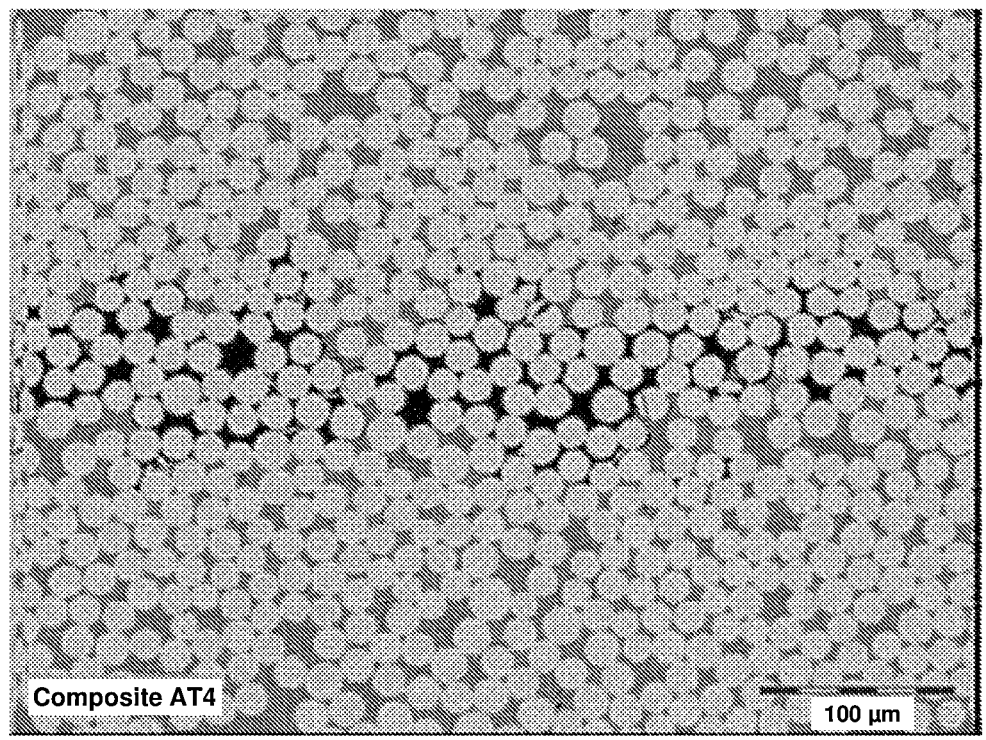
[Fig. 4]
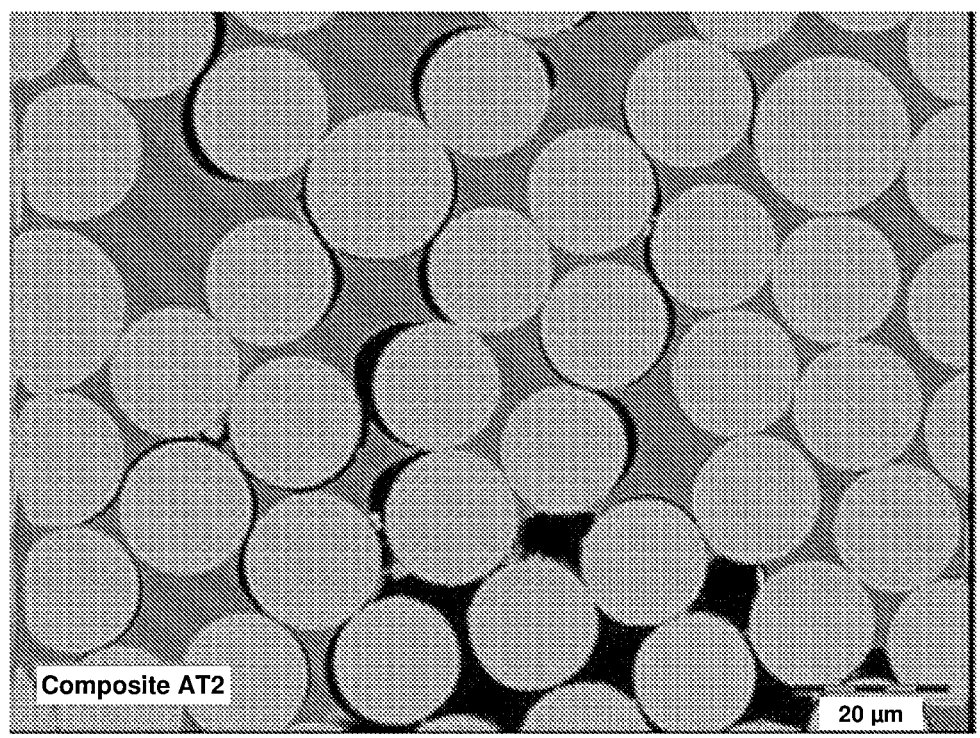

[Fig. 5]
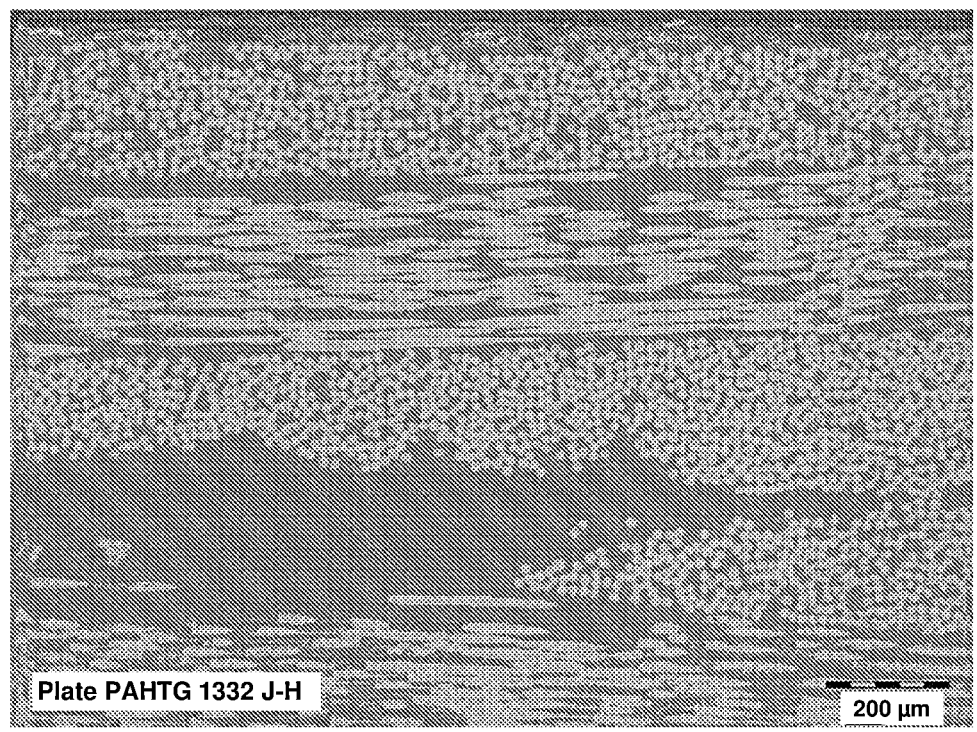
[Fig. 6]
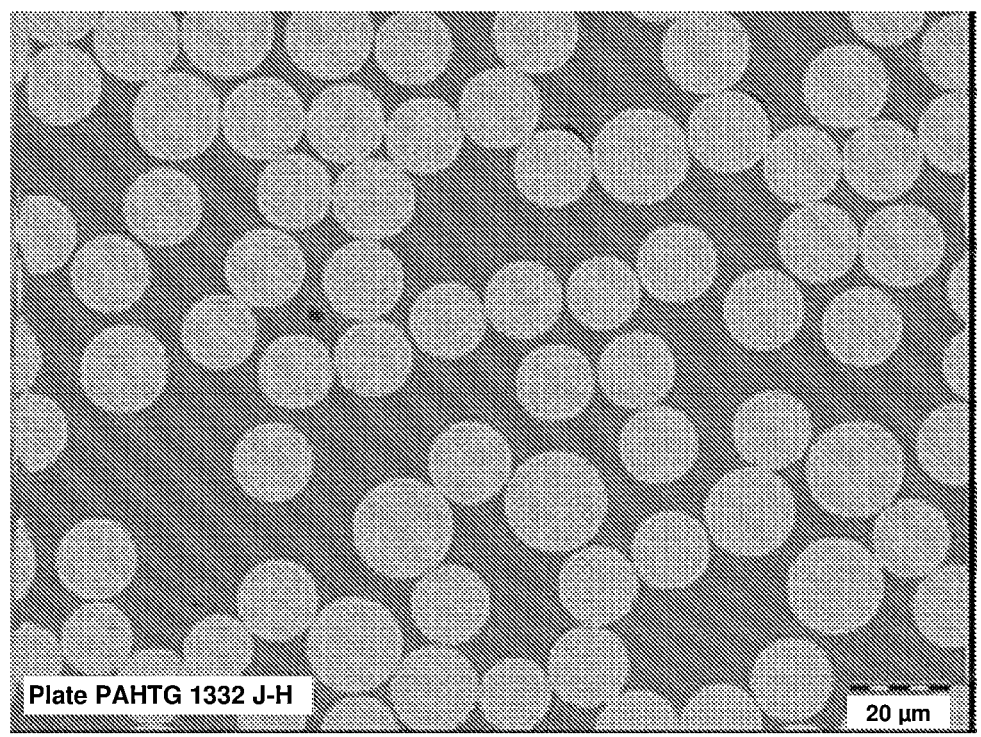

US 12,173,129 B2

FIBROUS MATERIAL IMPREGNATED WITH THERMOPLASTIC POLYMER OF OPTIMUM MOLECULAR MASS AND VISCOSITY AND METHOD FOR THE PRODUCTION THEREOF

TECHNICAL FIELD

The present invention concerns a fibrous material impregnated with an amorphous or semi-crystalline thermoplastic polymer having a glass transition temperature such that $Tg \geq 40°$ C., especially $Tg \geq 100°$ C., in particular $\geq 120°$ C., said impregnated fibrous material having a fiber content from 45 to 65% by volume, preferably from 50 to 60% by volume, especially from 54 to 60% by volume, the number-average molecular mass Mn of said thermoplastic polymer being from 11,000 to 25,000 g/mol, the melt viscosity of said thermoplastic polymer being from 80 to 1500 Pa·s, as measured by plane-plane rheology at 1 Hz and 2% deformation, at a temperature of $Tg+220°$ C.

More particularly, the invention aims to propose an impregnated fibrous material as defined above and whereof the polymolecularity index Ip of said thermoplastic polymer is from 2 to 6, in particular from 2 to 3.5, especially from 2.5 to 3.5.

The invention also relates to the method for preparing said fibrous material and to its use for manufacturing composite parts, in particular by automatic laying by means of a robot or by a method of filament winding.

In the present invention, "fibrous material" refers to an assembly of individual reinforcing fibers. After impregnation with the resin, it assumes the form of a ribbon (tape) or a ply or a pultruded plate.

The term "ribbon" (or tape) refers to a strip, which is a semi-finished product of low thickness, not calibrated in width and in thickness, and made up of a single roving of fibers, or a thin band made up of one or more fiber rovings, calibrated in thickness and in width.

This fibrous material can also be pre-impregnated only with the resin, leading to a semi-finished product generally in the form of fabrics or NCFs which will be assembled and consolidated to make a thermoformable composite plate or positioned directly in a mold to make the final part.

Such pre-impregnated or impregnated fibrous materials are in particular suitable for producing light composite materials for manufacturing mechanical parts having a three-dimensional structure and having good mechanical and thermal properties. When the fibers are made from carbon and/or the resin is filled with suitable additives, these fibrous materials are capable of discharging electrostatic charges. The use of flame-retardant resins or flame-retardant additives in resins that are not flame retardant allows the impregnated fibrous materials to withstand fires. They therefore have properties compatible with production of parts in particular in the mechanical, aeronautic, naval, automobile, oil and gas, in particular offshore, gas storage, energy, health and medical, sports and recreation, and electronics fields.

Such impregnated fibrous materials are also called composite materials. They comprise the fibrous material consisting of reinforcing fibers, and of a matrix consisting of the polymer impregnating the fibers. The first role of this matrix is to keep the reinforcing fibers in a compact shape and to give the desired shape to the final product. This matrix also ensures the charge transfer between the fibers, and therefore conditions the mechanical strength of the composite. Such a matrix also serves to protect the reinforcing fibers against abrasion and an aggressive environment, to control the surface appearance and to disperse any charges between the fibers. The role of this matrix is important for the long-term holding of the composite material, in particular regarding fatigue and creep.

STATE OF THE ART

Good quality of the three-dimensional composite parts produced from impregnated fibrous materials is generally achieved by mastery of the method for pre-impregnating or impregnating the reinforcing fibers with thermoplastic polymer and therefore of the resulting final impregnated fibrous material.

The disadvantages of the state of the art consist of the difficulty of obtaining a good impregnation of the fibers, while having good mechanical properties. Such a compromise is difficult to obtain, since to have good mechanical properties, the molar mass must be high, which means a high viscosity.

Thus, the molar mass affects the value of the Tg of the resin and the Tg increases with the molar mass, until it reaches a constant rate at which the Tg no longer varies significantly. The Tg has a first-order impact on the mechanical properties of the resin, in particular its modulus and the temperature stability of this modulus: it is common practice only to use the composite up to a maximum temperature equal to $Tg-10$ to $-30°$ C.

When the molar mass increases, the tensile strength of the composite also increases, but the viscosity in the molten state of the resin increases and makes the impregnation of fibers more difficult, then the final consolidation of the composite part more difficult, since in this step, movements of fibers and resin are necessary to fill in the porosities, in particular between band and intertapes.

This problem is further increased when the Tg of the polymer is high, since the viscosity depends on the deviation between the implementation temperature and the Tg of the polymer.

To date, the manufacture of ribbons of fibrous material reinforced by impregnation with thermoplastic polymer or thermosetting polymer was carried out using several methods that particularly depend on the nature of the polymer, the desired type of final composite material and its field of applications, some of these methods being constituted by an impregnation step followed by a step of hot rolling of the impregnated fibrous material or a drying step optionally followed by a step of melting of the thermoplastic polymer.

Thus, wet impregnation technologies or those using a liquid precursor or a precursor with a very low viscosity, polymerizing in situ, are often used to impregnate the reinforcing fibers with thermosetting polymers, such as epoxy resins for example, as described in patent WO2012/066241A2. These technologies are generally not directly applicable to impregnation by thermoplastic polymers, since these rarely have liquid precursors.

The current techniques for impregnating fibrous materials and shaping such impregnated fibrous materials in the form of calibrated ribbons therefore have several drawbacks. It is for example difficult to heat a molten mixture of thermoplastic polymers homogeneously in a die and at the outlet of a die, to the core of the material, which alters the quality of the impregnation. Furthermore, the temperature difference existing between the fibers and a molten mixture of polymers in a furnace, particularly infrared, also alters the quality and homogeneity of the impregnation. Furthermore, this impregnation mode by the molten route does not make it possible to obtain a high level of fibers or high production speeds due to the high viscosity of the thermoplastic resins, in particular when they have high glass transition temperatures, which is necessary to obtain high-performance composite materials.

In particular, impregnation methods by crosshead-die extrusion of a molten polymer are suitable for the use of low viscosity thermoplastic polymers only. Thermoplastic polymers, in particular those with a high glass transition temperature, therefore have a viscosity in the molten state that is too high to allow a satisfactory impregnation of the fibers and semi-finished or finished products of good quality.

It is then necessary in this case to use pre-polymers, whether they are reactive themselves or reactive with one another, or a pre-polymer and a chain extender, to perform the pre-impregnation with a fluid product that is easy to impregnate, then next to heat the pre-impregnated product so as to finalize the impregnation.

However, the use of pre-polymers presents other disadvantages, and in particular the pre-polymers must have relatively slow kinetics in order to allow impregnation, but also relatively fast kinetics to allow a manufacture which is compatible with an industrial rhythm. This requires a compromise which is sometimes difficult to achieve.

DESCRIPTION OF THE INVENTION

The invention therefore aims to address at least one of the disadvantages of the prior art, and in particular aims to obtain an impregnated fibrous material as defined above with a thermoplastic polymer matrix whereof the three parameters of melt viscosity, implementation temperature and average molecular mass by weight are selected optimally so as to allow the use of a nonreactive thermoplastic polymer and not of a polymer derived from reactive precursors (pre-polymers or monomers), thus making it possible to avoid the disadvantages of said pre-polymers or monomers.

Description of the Embodiments

To this end, the object of the invention is an impregnated fibrous material comprising at least one continuous-fiber fibrous material in the form of a roving or a plurality of parallel rovings and at least one thermoplastic polymer matrix, characterized in that said at least thermoplastic polymer is an amorphous or semi-crystalline polymer having a glass transition temperature such that Tg≥40° C., especially Tg≥100° C., in particular ≥120° C., the fiber content in said impregnated fibrous material being from 45 to 65% by volume, preferably from 50 to 60% by volume, especially from 54 to 60% by volume, the number-average molecular mass Mn of said thermoplastic polymer being from 11,000 to 25,000 g/mol, the melt viscosity of said thermoplastic polymer being from 80 to 1500 Pa·s, as measured by plane-plane rheology at 1 Hz and 2% deformation, at a temperature of Tg+220° C.

The glass transition temperature Tg of the thermoplastic polymer matrix is measured using a differential scanning calorimeter (DSC), after a second heating pass, according to standard ISO 11357-2:2013. The heating and cooling rate is 20° C./min.

The Inventors have therefore found that a nonreactive thermoplastic polymer which has a particular melt viscosity at the implementation temperature of said fibrous material polymer and an average molecular mass by weight made it possible to impregnate a fibrous material without needing to use a polymer derived from reactive precursors (pre-polymers or monomers), thus leading to obtaining an impregnated fibrous material having an excellent compromise between the impregnation quality, the compatibility with autoclave-free consolidation techniques and the mechanical properties.

In other words, the Inventors have found that in order to have a good impregnation of a fibrous material, it was necessary to obtain a glass transition temperature Tg+220° C., which makes it possible to obtain an adequate transformation or implementation temperature to have not only a good melt viscosity, but also an average molecular mass by weight which is sufficient to guarantee good mechanical properties.

First, the various proportions of component monomers of the polymer are selected to achieve an average molar mass by weight of at least 11,000 g/mol and less than 25,000 g/mol, for example with the use of chain limiters, which makes it possible to control the molar mass of the polymer, which makes it possible to obtain a polymer which, after impregnation of a fibrous material, will make it possible to obtain a composite having good mechanical properties without disrupting the impregnation of said fibrous material at the transformation or implementation temperature at Tg+220° C. due to the molten viscosity obtained at this temperature from 80 to 1500 Pa·s.

Thus, if a transformation or implementation temperature is adopted equal to Tg+150° C., the molten viscosity at this temperature will be less fluid compared to that obtained at a temperature Tg+220° C. Nevertheless, even if the molten viscosity is in the claimed range from 80 to 1500 Pa·s, the number-average molecular mass will then be less than the critical number-average molecular mass, which must be from 11,000 to 25,000 g/mol, and the impregnation will not be correct.

On the contrary, at Tg beyond Tg+220° C., there is then a risk of degradation of the product at this temperature and the obtained product will therefore exhibit unsatisfactory mechanical properties despite a correct molecular mass and a good viscosity.

There is therefore indeed a good compromise with three factors, the transformation or implementation temperature, i.e., Tg+220° C., the viscosity, i.e., 80 to 1500 Pa·s., and the critical number-average molecular mass, which must be from 11,000 to 25,000 g/mol.

The expression "non-reactive thermoplastic polymer" means that the thermoplastic polymer has a molecular weight that is no longer likely to change significantly, that is its number-average molecular weight (Mn) changes by less than 20% when it is used and therefore corresponding to the final polyamide polymer of the thermoplastic matrix.

The number-average molar mass (Mn) and molar mass by weight (Mw) of the polymers was determined by steric exclusion chromatography according to standards ISO 16014-1:2012, 16014-2:2012 and 16014-3:2012 using the following conditions:
Apparatus: Waters Alliance 2695 instrument
Solvent: hexafluoroisopropanol stabilized with 0.05 M of potassium trifluoroacetate
Flow rate: 1 ml/minute
Temperature of the columns: 40° C.
Two columns in series: 1000 Å PFG and 100 Å PFG (PPS)
Concentration of the samples: 1 g/L (dissolution at ambient temperature for 24 h)
Filtration of the samples using a syringe with an ACRODISC PTFE filter diameter 25 mm porosity 0.2 μm
Injection volume: 100 μL Refractometric detection at 40° C. with UV detection at 228 nm
Calibration by PMMA standards from 1,900,000 to 402 g·mol$^{-1}$. Calibration curve modeled by a fifth-degree polynomial.

The molten viscosity is measured by oscillatory rheology at a temperature Tg+220° C., on a Physica MCR301 apparatus between two parallel planes with a diameter of 25 mm.

The viscosity is measured over a maximum time of ten minutes.

It is quite clear that the non-reactive thermoplastic polymer must be stable at the measurement temperature of the molten viscosity.

In the case where said thermoplastic polymer is not stable at this temperature, it is then necessary to stabilize the polymers, in particular by an antioxidant or a mixture of antioxidants in proportion by weight relative to the thermoplastic polymer from 0.1 to 4%, in particular from 0.1 to 1%.

Advantageously, the antioxidant is selected from hindered phenols, such as Irganox® (BASF) or BHT (butylated hydroxytoluene), secondary aromatic amines such as alkyl diphenylamines, phosphites such as Tris(2,4-di-tert-butylphenyl)phosphite or Irgafos® (CIBA).

Advantageously, the deviation between the melting temperature Tm of said at least semi-crystalline thermoplastic polymer and its Tg is less than or equal to 200° C. (Tm–Tg≤200° C.).

In one embodiment, the polymolecularity index Ip of said thermoplastic polymer is from 2 to 6, in particular from 2 to 3.5, especially from 2.5 to 3.5.

The polymolecularity index, denoted Ip, is measured by steric exclusion chromatography or gel permeation chromatography) and corresponds to the ratio Mw/Mn.

The polymolecularity index provides an initial idea of the distribution of the molar masses of the various macromolecules within the polymer. For a perfect polymer, in which all the macromolecules are linear, have the same length, and therefore the same molar mass, the polymolecularity index Ip would be equal to 1. For a polyamide obtained by polycondensation from, among other monomers, diamines and dicarboxylic acids, the expected polymolecularity index Ip is 2.0.

A polymolecularity index greater than 2 can be due to the presence of ramifications or branches on the main chain of the polymer. In the case of copolyamides, they may appear on the nitrogen atom of the amide function. Thus, they can be quantified by NMR (Nuclear Magnetic Resonance) by comparing the (branched) tertiary aromatic amide level to the (linear) secondary aromatic amide level.

The presence of branches will affect the viscosity of the resin. The more numerous the branches are, the greater the viscosity will be, thus leading to poor impregnation.

It may therefore prove necessary to control the level of branches in the thermoplastic polymer used.

Throughout the description, the term "pre-impregnation" or "pre-impregnated" is used to refer to a fibrous material on which the thermoplastic polymer is deposited before said polymer is melted on the fibrous material, and the term "impregnation" or "impregnated" is used to refer to a fibrous material on which said thermoplastic polymer has been melted, especially by a heating system, or a fibrous material for which the impregnation has been finalized.

Thermoplastic Polymer Matrix

Said at least thermoplastic polymer matrix is an amorphous or semi-crystalline polymer whose glass transition temperature is such that Tg≥40° C., especially Tg≥100° C., in particular ≥120° C.

The number-average molecular mass Mn of said thermoplastic polymer is from 11,000 to 25,000 g/mol, the molten viscosity of said thermoplastic polymer being from 80 to 1500 Pa·s, as measured by plane-plane rheology at 1 Hz and 2% deformation, at a temperature of Tg+220° C.

Thermoplastic, or thermoplastic polymer, refers to a material that is generally solid at ambient temperature, which may be semi-crystalline or amorphous, and that softens during a temperature increase, in particular after passing its glass transition temperature (Tg) and flows at a higher temperature when it is amorphous, or that may exhibit a sharp transition upon passing its so-called melting temperature (Tm) when it is semi-crystalline, and which becomes solid again when the temperature decreases below its crystallization temperature (for a semi-crystalline) and below its glass transition temperature (for an amorphous).

The Tg and Tm are determined by differential scanning calorimetry (DSC) according to standard 11357-2:2013 and 11357-3:2013, respectively.

As for the polymer making up the impregnation matrix for the fibrous material, it is advantageously a thermoplastic polymer or a mixture of thermoplastic polymers.

This polymer or mixture of thermoplastic polymers can be ground in powder form, so that it can be used in a device such as a tank, in particular in a fluidized bed or aqueous dispersion.

The device in tank form, in particular in a fluidized bed, may be open or closed.

The thermoplastic polymers going into the makeup of the impregnation matrix of the fibrous material can be chosen from:
- the polymers and copolymers from the family of aliphatic, cycloaliphatic or semi-aromatic polyamides (PA) (also called polyphthalamides (PPA)),
- polyureas, in particular aromatic polyureas,
- polymers and copolymers from the family of acrylics such as polyacrylates, and more particularly polymethyl methacrylate (PMMA) or derivatives thereof,
- polymers and copolymers from the family of poly(aryletherketones) (PAEK) such as polyether ether ketone (PEEK), or poly(aryletherketonesketones) (PAEKK) such as poly(etherketoneketone) (PEKK) or derivatives thereof,
- aromatic polyether-imides (PEI),
- polyarylsulfides, in particular polyphenyl sulfides (PPS),
- polyarylsulfides, in particular polyphenylene sulfones (PPSU),
- polyolefins,
- polylactic acid (PLA),
- polyvinyl alcohol (PVA),
- fluorinated polymers, in particular polytetrafluoroethylene (PTFE) or polychlorotrifluoroethylene (PCTFE), and mixtures thereof.

Advantageously, the pre-polymers making up the matrix are selected from among polyamides (PA), in particular chosen from among aliphatic polyamides, cycloaliphatic polyamides, and semi-aromatic polyamides (polyphthalamides) optionally modified by urea units, and copolymers thereof, polymethyl methacrylate (PPMA) and copolymers thereof, polyether imides (PEI), polyphenylene sulfide (PPS), polyphenylene sulfone (PPSU), polyether ketone ketone (PEKK), polyether ether ketone (PEEK).

For the fluorinated polymers, it is possible to use a homopolymer of vinylidene fluoride (VDF with formula $CH_2=CF_2$) or a copolymer of VDF comprising, by weight, at least 50% by mass of VDF and at least one other monomer copolymerisable with VDF. The VDF content must be greater than 80% by mass, or better still 90% by mass, in order to ensure good mechanical and chemical resistance of the structural part, especially when it is subject to thermal and chemical stresses. The co-monomer must be a fluorinated monomer, for example vinyl fluoride.

For structural parts having to withstand high temperatures, aside from fluorinated polymers, according to the invention PAEK (polyaryletherketone) such as poly(ether ketones) PEK, poly(ether ether ketone) PEEK, poly(ether ketone ketone) PEKK, Poly(ether ketone ether ketone ketone) PEKEKK or PA with a high glass transition temperature Tg) are advantageously used.

Advantageously, when said polymer is a mixture of two polymers P1 and P2, the proportion by weight of polymer P1 and P2 is between 1-99% and 99-1%.

Advantageously, when said thermoplastic polymer is a mixture, and when the preimpregnation method uses a dry powder, this mixture comes in the form of a powder resulting either from dry blending before introduction into the preimpregnation tank or by dry blending directly in the tank or even by milling of a compound made in advance in an extruder.

In a first variant, the number-average molecular mass Mn of said thermoplastic polymer is from 14,000 to 25,000 and preferably 15,000 to 21,000, and the molten viscosity of said thermoplastic polymer is from 150 to 1500 Pa·s and preferably from 200 to 750 Pa·s at a temperature of Tg+220° C., and said thermoplastic polymer is a polymer with Tg≥30° C.

The thermoplastic polymer can therefore be any thermoplastic polymer defined above as long as the Tg≥130° C.

Optionally, the thermoplastic polymer or mixture of thermoplastic polymers further comprises carbon-based fillers, in particular carbon black or carbon-based nanofillers, preferably chosen from among graphenes, carbon nanotubes, carbon nanofibrils or mixtures thereof. These fillers make it possible to conduct electricity and/or heat, and therefore to facilitate the melting of the polymer matrix when it is heated.

Optionally, said thermoplastic polymer comprises at least one additive, in particular chosen from among a catalyst, an antioxidant, a heat stabilizer, a UV stabilizer, a light stabilizer, a lubricant, a filler, a plasticizer, a flame retardant, a nucleating agent, a chain extender and a dye, an electrical conductor, a heat conductor or a mixture thereof.

Advantageously, said additive is chosen from among a heat stabilizer, an antioxidant, a flame retardant, an electrical conductor and a heat conductor.

The thermoplastic polymer or mixture of thermoplastic polymers can further comprise liquid crystal polymers or cyclized polybutylene terephthalate, or mixtures containing the latter, such as the CBT100 resin marketed by CYCLICS CORPORATION. These compounds in particular make it possible to fluidify the polymer matrix in molten state, for better penetration to the core of the fibers. Depending on the nature of the polymer, or of the polymer mixture of thermoplastic polymers, used to implement the impregnation matrix, notably the melting point thereof, one or another of these compounds will be selected.

Advantageously, said at least one thermoplastic polymer is selected from among polyamides, PEKK, PEI and a mixture of PEKK and PEI.

Advantageously, when said polymer is a mixture of two polymers P1 and P2, this mixture consists of a powder obtained by dry blend, before introduction into the tank or directly into the tank, and this mixture of two polymers P1 and P2 is a mixture of PEKK and PEI.

Advantageously, the PEKK/PEI mixture is from 90-10% to 60-40% by weight, in particular from 90-10% to 70-30% by weight.

In this first variant, said thermoplastic polymer can therefore be any thermoplastic polymer as defined above as long as the Tg≥30° C.

Polyamide Thermoplastic Polymer Matrix

In one embodiment of the first variant defined above, said at least one thermoplastic polymer is a polyamide, in particular a heat-stabilized polyamide.

The heat stabilizer is in particular necessary for polyamides which are likely to degrade at the temperature Tg+220° C.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the person skilled in the art.

The polyamide can be a homopolyamide or a co-polyamide or a mixture thereof.

In this first variant where said thermoplastic polymer is a polyamide with Tg≥130° C., in particular a heat-stabilized polyamide, advantageously, said polyamide is a semi-aromatic polyamide.

For semi-aromatic polyamides, it is optionally modified by urea units, and is in particular a semi-aromatic polyamide with formula X/YAr, as described in EP1505099, in which:
  Y denotes the residues of an aliphatic diamine having 8 to 20 carbon atoms,
  Ar denotes the residues an aromatic dicarboxylic acid group,
  X denotes the residues of the NH2-(CH2)10-COOH aminoundecanoic acid, the lactam 12 or the corresponding amino acid, or to the Y, x pattern group from the condensation of the diamine with a dialiphatic acid (x) having between 8 and 20 carbon atoms or to the Y, I pattern group from the condensation of the diamine with isophthalic acid.

The X/YAr polyamide is particularly a semi-aromatic polyamide of formula A/XT in which A is chosen from a unit obtained from at least one amino acid, a unit obtained from at least one lactam and at least one unit corresponding to the formula (Ca diamine)·(Cb diacid), with a representing the number of carbon atoms of the diamine and b representing the number of carbon atoms of the diacid, a and b each being between 4 and 36, advantageously between 9 and 18, the (Ca diamine) unit being chosen from linear or branched aliphatic diamines, cycloaliphatic diamines and alkylaromatic diamines and the (Cb diacid) unit being chosen from linear or branched aliphatic diacids, cycloaliphatic diacids and aromatic diacids;
  X.T denotes a unit obtained from the polycondensation of a Cx diamine and terephthalic acid, with x representing the number of carbon atoms of the Cx diamine, x being between 6 and 36, advantageously between 9 and 18.

A/XT is in particular a polyamide with formula A/6T, A/9T, A/10T or A/11T, A being as defined above, in particular a polyamide PA 6/6T, a PA 66/6T, a PA 6I/6T, a PA MXDT/6T, a PA MPMDT/6T, a PA PA11/10T, a PA 11/6T/10T, a PA MXDT/10T, a PA MPMDT/10T, a PA BACT/10T, a PA BACT/6T, a PA 11/BACT, a PA BACT/10T/6T, a PA 11/BACT/6T, PA 11/MPMDT/6T, a PA 11/BACT/10T, a PA 11/MXDT/10T, a PA 11/MXDT/6T.

It is clear that for co-polyamides with formula A/XT, the proportion of A and XT is a function of the Tg, which must in this case be greater than or equal to 130° C.

T corresponds to terephthalic acid, MXD corresponds to m-xylylene diamine, MPMD corresponds to methylpentamethylene diamine and BAC corresponds to bis(aminomethyl)cyclohexane, which can as well 1,3 BAC as 1,4 BAC.

Advantageously, said polyamide is a semi-aromatic polyamide chosen from a PA MXDT/6T, a PA MPMDT/6T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, a PA 11/MPMDT/6T, PA 11/BACT/10T, a PA 11/MXDT/10T, a PA 11/MXDT/6T.

In a second variant, the number-average molecular mass Mn of said thermoplastic polymer is from 11,000 to 20,000 g/mol and preferably 12,000 to 18,000, the molten viscosity of said thermoplastic polymer is from 80 to 650 Pa·s and preferably from 100 to 450 Pa·s at a temperature of Tg+220° C., and said thermoplastic polymer is a polyamide with Tg<130° C.

In this second variant, the thermoplastic polymer therefore can only be a polyamide with Tg<130° C.

Advantageously, said polyamide is selected from aliphatic polyamides, cycloaliphatic polyamides and semi-aromatic polyamides with Tg less than 130° C., preferably aliphatic polyamides, cycloaliphatic polyamides.

The aliphatic and cycloaliphatic polyamides consist of repeating aliphatic units selected from a unit obtained from the polycondensation of at least one amino acid and a unit obtained from the polycondensation of at least one lactam (for the aliphatic polyamides) or a repeating unit X.Y obtained from the polycondensation:
- of at least one diamine, said diamine being chosen from a linear (or branched) aliphatic diamine, and a cycloaliphatic diamine
- of at least one dicarboxylic acid, said diacid being chosen from a dialiphatic acid and a dicycloaliphatic acid,
- said diamine and said diacid comprising from 4 to 36 carbon atoms, advantageously from 6 to 18 carbon atoms,
- as well as for the aliphatic polyamides as for the cycloaliphatic polyamides.

It is clear that a cycloaliphatic polyamide comprises at least one dicycloaliphatic amine and/or a dicycloaliphatic acid in the XY unit.

Advantageously, when said thermoplastic polymer is an aliphatic polyamide, it is selected from:
polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010 and polyamide 12/1010, or a mixture thereof or a copolyamide thereof, and block copolymers, especially polyamide/polyether (PEBA).

The semi-aromatic polyamides are as defined above as long as their Tg is less than 130° C., especially chosen among and the semi-aromatic polyamides are chosen among MXD10, MXD6, PA 6/6T, a PA 66/6T, a PA 6I/6T, MPMDT/10T, 11/MPMDT/10T, MP MDT/6T, a PA BACT/10T, a PA 11/BACT/10T, a MXDT/10 and a PA 11/MXDT/10T.

Fibrous Material:

Concerning the fibers constituting said fibrous material, they are notably continuous fibers of mineral, organic or plant origin in the form of rovings.

Advantageously, the number of fibers in said fibrous material for carbon fibers is greater than or equal to 3K, in particular greater than or equal to 6K, particularly greater than or equal to 12K.

Advantageously, the number of fibers in said fibrous material for carbon fibers is greater than or equal to 12K, in particular chosen from 12K, 24K, 48K, 50K and 400K, particularly 12K, 24K, 48K and 50K.

Advantageously, the grammage for the glass fiber is greater than or equal to 1,200 Tex, in particular greater than or equal to 2,400 Tex, greater than or equal to 4,800 Tex.

The Tex means that 1000 m of base yarn weighs 1 g.

The mineral fibers include carbon fibers, glass fibers, basalt fibers, silica fibers, or silicon carbide fibers, for example. The organic fibers include thermoplastic or thermosetting polymer-based fibers, such as semi-aromatic polyamide fiber, aramid fibers or polyolefin fibers, for example. Preferably, they are amorphous thermoplastic polymer-based and have a glass transition temperature Tg greater than the Tg of the thermoplastic polymer or polymer mixture making up the impregnation matrix when the matrix is amorphous or greater than Tm of the thermoplastic polymer or polymer mixture making up the impregnation matrix when the latter is semi-crystalline. Advantageously, they are semi-crystalline thermoplastic polymer-based and have a melting point Tm greater than the Tg of the thermoplastic polymer or polymer mixture making up the impregnation matrix when the matrix is amorphous or greater than Tm of the thermoplastic polymer or polymer mixture making up the impregnation matrix when the latter is semi-crystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

It can also correspond to fibers with support threads.

These component fibers can be used alone or in mixtures. Thus, organic fibers can be mixed with mineral fibers in order to be impregnated with thermoplastic polymer and to form the impregnated fibrous material.

The organic fiber rovings can have several grammages. They can further have several geometries.

Preferably, the fibrous material is composed of continuous carbon, glass, basalt or silicon carbide fibers or a mixture thereof, in particular carbon fibers. It is used in the form of a roving or several rovings, which then consist of a single roving having the addition of the fibers of each roving.

The fibers of the fibrous material may or may not be sized.

The term "sized" refers to the surface treatments applied to the fibrous materials during the manufacture thereof. It may also refer to a transient pretreatment at the beginning of the pre-impregnation step, whether it is carried out directly in line with the impregnation or not. It may also refer to a transient pretreatment at the beginning of the pre-impregnation step, whether it is carried out directly in line with the impregnation or not.

They are generally organic (of the thermosetting or thermoplastic resin type) and quite often formulated for the pre-impregnation of polymer reinforcing fibers with a low melting point Tm or thermosetting with a low Tg point.

These sizings are also useful to protect the dry fibers from damage during contact with a guiding system.

In the case of a non-sized material, said fibrous material can comprise up to 0.1% by weight of an organic material (thermosetting or thermoplastic resin type) called sizing.

In the case of a transient pretreatment carried out by the impregnator for example at the beginning of the step of pre-impregnating the reinforcing fibers, the sizing can be an organic liquid such as water, a low- or high-molecular weight alcohol (ethanol, methanol, isopropanol for example), a ketone (acetone, etc.) which will serve as transient sizing; that is to say, it will be present for a short length of time in contact with the fiber to allow it to be manipulated in the "dry" state (that is to say, before the pre-impregnation) and it will next be removed from the composite material so as not to disrupt the final characteristics of the composite.

In the case of a sized material, said fibrous material can comprise from 0.1% by weight to 2.5% by weight of an organic material (thermosetting or thermoplastic resin type) called sizing.

Advantageously, the fibers of the fibrous material are non-sized.

The term "non-sized" means that the fiber is either not initially sized and therefore has not undergone surface treatment, or that the fiber has been de-sized prior to use.

Advantageously, the content of fibers by volume is constant in at least 70% of the volume of the impregnated fibrous material, particularly in at least 80% of the volume of the impregnated fibrous material, in particular in at least 90% of the volume of the impregnated fibrous material, more particularly in at least 95% of the volume of the impregnated fibrous material.

Advantageously, the distribution of the fibers is homogeneous in at least 95% of the volume of the impregnated fibrous material.

The fiber rate by volume is measured locally on a representative elementary volume (REV).

The term "constant" means that the fiber rate by volume is constant to within any measurement uncertainty, which is plus or minus 1%.

The term "homogeneous" means that the impregnation is uniform and that there are no dry, i.e., non-impregnated fibers, and that, conversely, there is no zone of pure resin without fiber in at least 95% of the volume of the ribbon of impregnated fibrous material.

Advantageously, the porosity level in said impregnated fibrous material is less than 10%, in particular less than 5%, particularly less than 2%.

It should be noted that a nil porosity level is difficult to achieve and that as a result, advantageously the porosity level is greater than 0% but less than the levels cited above.

The porosity level corresponds to the closed porosity level and can be determined either by electron microscopy, or as being the relative deviation between the theoretical density and the experimental density of said impregnated fibrous material as described in the examples section of the present invention.

Advantageously, said impregnated fibrous material is single-layered.

The term "single layer" means that when the fibrous material is impregnated, said fibrous material and polymer are indissociable from each other and form a material composed of a single fiber and polymer-based layer, since the impregnation is carried out particularly homogeneously and to the core, and particularly with at least one spreading during the impregnation.

Advantageously, in the absence of reheating, the impregnated fibrous material is non-flexible.

This means that the impregnated fibrous material is not capable of assuming a complex shape at ambient temperature and that it can do so only beyond the Tm of the resin. In other words, the impregnated fibrous material does not have drapability.

Conversely, when the fibrous material is pre-impregnated, it is flexible and can follow the shape of the mold, at least in the case of shapes that are not overly complex.

The various characteristics of number of fibers, fiber content, sizing, fiber distribution, flexibility and the single-layer characteristic may each be combined with one or more others in combination with those of the object of the invention and can be the subject of as many embodiments as of possible combinations forming an integral part of the invention.

In the impregnated materials, also called "ready to use", the polymer or mixture of thermoplastic impregnation polymers is distributed uniformly and homogeneously around the fibers. In this type of material, the thermoplastic impregnation polymer must be distributed as homogeneously as possible within the fibers in order to obtain minimal porosities, that is to say, minimal empty spaces between the fibers. Indeed, the presence of porosities in this type of material can act as stress concentration spots, during mechanical tensile stressing, for example, and which then form crack initiation points of the impregnated fibrous material and mechanically compromise it. A homogeneous distribution of the polymer or mixture of polymers therefore improves the mechanical strength and homogeneity of the composite material formed from these impregnated fibrous materials.

Thus, in the case of "ready to use" impregnated materials, the fiber level in said impregnated fibrous material is between 45 to 65% by volume, preferably from 50 to 60% by volume, in particular from 54 to 60% by volume.

The impregnation rate can be measured by image analysis (using a microscope or photo or digital camera device, for example), of a cross-section of the ribbon, by dividing the surface area of the ribbon impregnated by the polymer by the total surface area of the product (impregnated surface plus surface of the porosities). In order to obtain a good quality image, it is preferable to coat the ribbon cut in its transverse direction with a standard polishing resin and to polish with a standard protocol allowing the observation of the sample under a microscope with at least 6× magnification.

According to another aspect, the present invention relates to a method for preparing an impregnated fibrous material as defined above, characterized in that it comprises a step of pre-impregnating or a step of impregnating said fibrous material with at least thermoplastic polymer being an amorphous or semi-crystalline polymer having a glass transition temperature such that Tg 40° C., especially Tg≥100° C., in particular ≥120° C., the fiber content of said impregnated fibrous material being from 45 to 65% by volume, preferably from 50 to 60% by volume, especially from 54 to 60% by volume, the number-average molecular mass Mn of said thermoplastic polymer being from 11,000 to 25,000 g/mol, the melt viscosity of said thermoplastic polymer being from 80 to 1500 Pa·s, as measured by plane/plane rheology at 1 Hz and 2% deformation, at a temperature of Tg+220° C.

All the features outlined above for the fibrous material and the thermoplastic polymer are also valid for said method.

In a first variant of the method, said method comprises a step of impregnating said fibrous material with at least thermoplastic polymer, the number-average molecular mass Mn of said thermoplastic polymer being from 11,000 to 20,000 g/and preferably 12,000 to 18,000, the molten viscosity of said thermoplastic polymer is from 80 to 650 Pa·s and preferably from 100 to 450 Pa·s at a temperature of Tg+220° C., and said thermoplastic polymer being a polymer with Tg<130° C.

Advantageously, said polyamide with Tg<130° C. is chosen among the aliphatic polyamides and the cycloaliphatic polyamides.

Advantageously, said aliphatic polyamide is chosen among polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, polyamide 12/1010, or a mixture thereof or a copolyamide thereof, and the block copolymers, especially polyamide/polyether (PEBA) and semi-aromatic polyamides with Tg<130° C., especially, and the semi-aromatic polyamides are chosen among the semi-aromatic polyamides are chosen among MXD10, MXD6, PA 6/6T, a PA 66/6T, a PA 6I/6T, MPMDT/10T, 11/MPMDT/10T, MPMDT/6T, a PA BACT/10T, a PA 11/BACT/10T, a MXDT/10 and a PA 11/MXDT/10T.

Advantageously, said pre-impregnation is carried out by the molten route, especially at high speed, in particular at a speed >1 m/min, preferably >2 m/min and still more preferably >3 m/min.

Advantageously, in the first variant of the method defined above, said method comprises the following steps:

i) impregnating a fibrous material with at least one nonreactive thermoplastic polymer by the molten route, in particular by pultrusion, by crosshead-die extrusion of molten polymer, in order to obtain an impregnated fibrous material, said pre-impregnation step being carried out with at least thermoplastic polymer, the number-average molecular mass Mn of said thermoplastic polymer being from 11,000 to 20,000 g/and preferably 12,000 to 18,000, the molten viscosity of said thermoplastic polymer is from 80 to 650 Pa·s and preferably from 100 to 450 Pa·s at a temperature of Tg+220° C., and said thermoplastic polymer being a polymer with Tg<130° C.

ii) optionally a step of shaping and calibrating said impregnated fibrous material to obtain an impregnated fibrous material consisting of a ribbon in the form of a thin band having a thickness from 0.2 to 5 mm and preferably a thickness from 0.2 to 1.3 mm.

In this first variant, the impregnation leads not to a pre-impregnated fibrous material, but to an impregnated fibrous material therefore not necessarily requiring a subsequent heating step to finalize the impregnation. It would not, however, be outside the scope of the invention if a subsequent heating step was carried out after said impregnation step.

In a second variant, said method comprises a step of pre-impregnating said fibrous material assuming the form of a roving or of several parallel rovings with at least one nonreactive thermoplastic polymer, the number-average molecular mass Mn of said thermoplastic polymer is from 14,000 to 25,000 and preferably 15,000 to 21,000 and the molten viscosity of said thermoplastic polymer is from 150 to 1500 Pa·s and preferably from 200 to 750 Pa·s at a temperature of Tg+220° C., and said thermoplastic polymer is a polymer with Tg≥130° C.

Advantageously, said at least one thermoplastic polymer is a polyamide, in particular heat-stabilized.

Advantageously, said polyamide is chosen among the semi-aromatic polyamides.

In this second variant, said pre-impregnation is carried out with a system chosen among powdering (deposition by gravity of a dry powder), spraying by spray gun, by continuous passage of the fibers in a fluidized bed or an aqueous dispersion of powder of said nonreactive thermoplastic polymer or aqueous dispersion of particles of said thermoplastic polymer or emulsion or aqueous suspension of said nonreactive thermoplastic polymer, in particular at high speed.

Advantageously, when the pre-impregnation is carried out by spraying by spray gun, a voluntary electrostatic charge method is precluded.

Advantageously, this second variant comprises at least one step of heating without support of said pre-impregnated fibrous material.

In this second variant, said pre-impregnation being carried out by a powder, a dispersion, emulsion or suspension of a powder, it is necessary to dry the powder, in particular deposited by dispersion, emulsion or suspension and/or to finalize or begin to finalize the impregnation.

Advantageously, said second variant comprises at least one heating step carried out using at least one supporting part (E) and at least one heating system, said roving(s) being in contact with part or all of the surface of said at least one supporting part (E) and scrolling partially or wholly on the surface of said at least one supporting part (E) at the heating system.

This heating step carried out by means of at least one supporting part (E) makes it possible to finalize the impregnation, which would not be finalized after heating without support.

When the pre-impregnation step is carried out by a dispersion, emulsion or suspension of a powder, the heating step without support is necessary to dry the pre-impregnated roving(s) and to finalize the impregnation. The heating step carried out using at least one supporting part (E) is then optional.

When the pre-impregnation step is carried out by fluidized bed or spraying by spray gun, the heating step without support is necessary to begin finalization of the impregnation, that is to say, to begin melting said thermoplastic polymer on said fibrous material. The heating step carried out using at least one supporting part (E) is then carried out to finalize the impregnation.

It is clear that the two heating steps can be carried out one after the other, that is to say, in two separate furnaces, or then take place in the same furnace, which then comprises both systems.

Advantageously, the heating system of the heating step without support or of the heating step with support is chosen from an infrared lamp, a UV lamp, a convection heating, a microwave heating, a laser heating and a high frequency (HF) heating.

It is clear that the two heating systems can be identical or different.

When the heating system is chosen from an infrared bulb, a UV bulb and convection heating, the supporting part is heating and heat conducting.

When the heating system is chosen from microwave heating, laser heating and high-frequency (HF) heating, the supporting part is not heating and not heat conducting.

Advantageously, a heating calender is excluded from the definition of the heating system with supporting part.

Advantageously, in the second variant, when said pre-impregnation is carried out by fluidized bed or spraying by nozzle or spray gun, in particular by fluidized bed, it is carried out in a tank equipped with at least one supporting part (E').

In one embodiment of the second variant described above, said method comprises the following steps:

Pre-impregnating a fibrous material with at least one nonreactive thermoplastic polymer by fluidized bed in a tank, equipped or not with at least one supporting part (E'), by spraying by nozzle or spray gun by the dry route in a tank, equipped or not with at least one supporting part (E') to obtain a pre-impregnated fibrous material, said pre-impregnation step being carried out by at least one nonreactive thermoplastic polymer, the number-average molecular mass Mn of said thermoplastic polymer is from 14,000 to 25,000 and preferably from 15,000 to 21,000, and the molten viscosity of said thermoplastic polymer is from 150 to 1500 Pa·s and preferably from 200 to 750 Pa·s at a temperature of Tg+220° C. and said thermoplastic polymer is a polymer with Tg≥130° C., heating step without support for the pre-impregnated fibrous material to obtain a pre-impregnated fibrous material, heating step carried out using at least one supporting part (E) and at least one heating system to obtain an impregnated fibrous material, heating step carried out using at least one supporting part (E) and at least one heating system to obtain an impregnated fibrous material, optionally step of shaping and calibrating the roving or said parallel rovings of said impregnated fibrous material to obtain an impregnated fibrous material consisting of a ribbon in the form of a thin band.

In another embodiment of the second variant described above, said method comprises the following steps:

Pre-impregnating a fibrous material with at least one nonreactive thermoplastic polymer, especially by continuous passage of the fibers in a fluidized bed of dry polymer powder, an aqueous dispersion of polymer powder or aqueous dispersion of polymer particles or emulsion or aqueous suspension of polymer, said pre-impregnation step being carried out by at least amorphous or semi-crystalline thermoplastic polymer and said thermoplastic polymer is a polymer with Tg≥130° C., said nonreactive thermoplastic polymer having a number-average molecular mass Mn of said thermoplastic polymer from 14,000 to 25,000 and preferably from 15,000 to 21,000 and the molten viscosity of said thermoplastic polymer is from 150 to 1500 Pa·s and preferably from 200 to 750 Pa·s, as measured in plane-plane rheology at 1 Hz and 2% deformation, at a temperature of Tg+220° C., step of heating without support of said pre-impregnated fibrous material to obtain a pre-impregnated fibrous material, optionally heating step carried out using at least one supporting part (E) and at least one heating system, as defined above, to obtain an impregnated fibrous material, optionally step of shaping and calibrating the roving or said parallel rovings of said impregnated fibrous material to obtain an impregnated fibrous material consisting of a ribbon in the form of a thin band.

Advantageously, the present invention relates to a method for preparing an impregnated fibrous material as defined above, characterized in that one or more supporters (E") is (are) present upstream of said system.

The expression "upstream of said system" means that the supporter(s) (E") is (are) present before the pre-impregnation step.

Advantageously, the present invention relates to a method for preparing an impregnated fibrous material as defined above, characterized in that said method is carried out for the dry powder route at a speed from at least 5 to 30 m/min and for the aqueous dispersion of at least 15 m/min.

Method for Preparation of the Impregnated Fibrous Material

The impregnated fibrous material, especially in a single layer, can be prepared in two or three steps as described above with an optional shaping and calibration step.

The First Step can be Carried Out by Pre-Impregnation of the Fibrous Material or by Impregnation of the Fibrous Material.

First Step: Preimpregnation

The first step of pre-impregnation to produce a pre-impregnated fibrous material can be carried out according to techniques well known to the person skilled in the art and particularly chosen from those disclosed above.

Thus, it can be carried out by a pre-impregnation technology by powder deposition, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E').

Fluidized Bed:

The preimpregnation step can be carried out in fluidized bed.

An example unit for carrying out a manufacturing method without the heating step using at least one supporting part is described in international application WO 2015/121583.

This system describes the use of a tank comprising a fluidized bed for performing the pre-impregnation step and can be used in the context of the invention.

Another example unit for carrying out a manufacturing method without the heating step using at least one supporting part but with supporters present in the tank is described in WO 2018/115736.

Advantageously, the tank comprising the fluidized bed is provided with at least one supporting part (E') which can be a compression roller.

Supporting part (E') must be understood to mean any system on which the roving has the possibility of traveling in the tank. The supporting part (E') can have any shape as long as the roving can pass over it.

It should be noted that the supporting parts (E) and (E') can be identical or different whether in terms of the material or shape and its characteristics (diameter, length, width, height, etc. as a function of the shape).

However, the supporting part (E') is not heating or heated.

The step of pre-impregnation of the fibrous material is carried out by passage of one or more rovings in a continuous pre-impregnation device, comprising a tank (10) provided with at least one supporting part (E') and comprising a fluidized powder bed (12) of said polymer matrix.

The powder of said polymer matrix or polymer is suspended in a gas G (air, for example) introduced into the tank and circulating in the tank (10) through a hopper (11). The roving(s) are circulated in this fluidized bed (12).

The tank can have any shape, in particular cylindrical or parallelepiped, particularly a rectangular parallelepiped or a cube, advantageously a rectangular parallelepiped.

The tank (10) can be an open or closed tank.

In the case where the tank is closed, it is then equipped with a sealing system so that the powder of said polymer matrix cannot leave said tank.

This pre-impregnation step is therefore carried out by dry route, that is to say, the thermoplastic polymer matrix is in powder form, in particular suspended in a gas, particularly air, but cannot be dispersed in a solvent or water.

Each roving to be pre-impregnated is unwound from a device with reels under the traction created by cylinders (not shown).

Each reel is provided with a brake (not shown) so as to apply tension on each fiber roving. In this case, an alignment module makes it possible to position the fiber rovings parallel to one another. In this way, the fiber rovings cannot be in contact with one another, which makes it possible to avoid mechanical damage to the fibers by friction relative to one another.

The fiber roving or the parallel fiber rovings then enter a tank (10), in particular comprising a fluidized bed (12), provided with a supporting part (E') that is a compression roller (24). The fiber roving or the parallel fiber rovings next leave(s) the tank after pre-impregnation after the residence time in the powder is optionally checked.

The expression "residence time in the powder" means the time during which the roving is in contact with said powder in the fluidized bed.

If the fibrous material, such as the glass, basalt or carbon fiber rovings, has a sizing, an optional step of de-sizing can be carried out before the fibrous material passes into the tank.

Advantageously, the tank used comprises a fluidized bed with a supporter and said preimpregnation step is carried out with a simultaneous spreading of said roving or rovings between the entry to and exit from the tank comprising said fluidized bed.

The expression "inlet of the tank" corresponds to the vertical tangent of the edge of the tank that comprises the fluidized bed.

The expression "outlet of the tank" corresponds to the vertical tangent of the other edge of the tank that comprises the fluidized bed.

The spreading consists of isolating each fiber constituting said roving as much as possible from the other fibers which surround it in the space closest thereto. It corresponds to the transverse spreading of the roving.

In other words, the transverse separation or the width of the roving increases between the entry to the tank comprising the fluidized bed and the exit from the tank comprising the fluidized bed and thus makes an improved preimpregnation of the fibrous material possible.

The use of at least one supporter (E'), in particular a cylindrical compression roller, in the preimpregnation step, therefore makes an improved preimpregnation possible compared to the methods from the prior art.

The expression "compression roller" means that the roving that passes bears partially or totally on the surface of said compression roller, which causes the spreading of said roving.

Advantageously, said at least one compression roller is cylindrical and the spreading percentage of said roving(s) between the inlet and the outlet of the tank of said fluidized bed is between 1% and 1000%, preferably from 100% to 800%, preferably from 200% to 800%, preferably from 400% to 800%.

The percentage of spreading is equal to the ratio of the final width of the roving to the initial width of the roving multiplied by 100.

The diameter of said at least one compression roller is from 3 mm to 500 mm, preferably from 10 mm to 100 mm, in particular from 20 mm to 60 mm.

Below 3 mm, the deformation of the fiber caused by the compression roller is too great.

Advantageously, the compression roller is cylindrical and not ribbed, and is in particular metallic.

When the supporting part (E') is at least one compression roller, according to a first variant, a single compression roller is present in the fluidized bed and said pre-impregnation is carried out at the angle $\alpha_1$ formed by said roving(s) between the inlet of said compression roller and the vertical tangent at said compression roller.

The angle $\alpha_1$ formed by said roving(s) between the inlet of said compression roller and the vertical tangent to said compression roller allows the formation of an area in which the powder will concentrate, thus leading to a "corner effect" that, with the simultaneous spreading of the roving by said compression roller, allows a pre-impregnation over a greater roving width and therefore an improved pre-impregnation compared to the techniques of the improved background art.

Throughout the description, all of the provided angle values are expressed in absolute values.

Advantageously, the angle $\alpha_1$ is comprised from 0 to 89°, preferably 5° to 85°, preferably 5° to 45°, preferably 5° to 30°.

Nevertheless, an angle $\alpha_1$ from 0 to 5° is likely to give rise to risks of mechanical stress, which will lead to breakage of fibers and an angle $\alpha_1$ from 85° to 89° does not create sufficient mechanical force for creating "the corner effect."

A value of the angle $\alpha_1$ equal to 0° therefore corresponds to a vertical fiber. It is clear that the height of the cylindrical compression roller is adjustable, thus making it possible to position the fiber vertically.

Advantageously, the inlet edge of the tank (23a) is equipped with a roller, in particular cylindrical and rotating, on which said roving(s) pass(es), thus leading to spreading prior to the pre-impregnation.

It is obvious that "the corner effect" caused by the angle $\alpha_1$ enhances the preimpregnation on one surface but the spreading of said roving obtained with the compression roller also makes it possible to have a preimpregnation on the other surface of said roving. In other words, said pre-impregnation is enhanced on one face of said roving or rovings near the angle $\alpha_1$ formed by said roving or rovings between the entry to said at least one compression roller $R_1$ and the vertical tangent to the compression roller $R_1$ but the spreading also makes pre-impregnation of the other face possible.

The angle $\alpha_1$ is as defined above.

Advantageously, the volume diameter D90 of the particles of thermoplastic polymer powder is from 30 to 500 µm, advantageously from 80 to 300 µm.

Advantageously, the volume diameter D10 of the particles of thermoplastic polymer powder is from 5 to 200 µm, advantageously from 15 to 100 µm.

Advantageously, the volume diameter of the particles of thermoplastic polymer powder is in the ratio D90/D10, or from 1.5 to 50, advantageously from 2 to 10.

Advantageously, the average volume diameter D50 of the particles of thermoplastic polymer powder is from 10 to 300 µm, in particular from 30 to 200 µm, more particularly from 45 to 200 µm.

The volume diameters of the particles (D10, D50 and D90) are defined according to standard ISO 9276:2014.

The "D50" corresponds to the average diameter by volume, that is to say, the value of the particle size that divides the examined population of particles exactly in half.

The "D90" corresponds to the value at 90% of the cumulative curve of the particle size distribution by volume.

The "D10" corresponds to the corresponds to the size of 10% of the volume of the particles.

According to other variants, two, three or more rollers can be present in the fluidized bed.

Spraying by Spray Gun:

Another example unit for carrying out a manufacturing method without the heating step using at least one supporting part but with supporters present in the tank is described in WO 2018/115737.

The step of preimpregnation of the fibrous material can also be carried out by sending one or more rovings into a device for continuous preimpregnation by spraying that comprises a tank comprising one or more nozzle(s) or one or more gun(s) spraying the polymer powder on the fibrous material at the roller entry.

The powder from polymer(s) or polymer is sprayed on said fibrous material in the tank by means of nozzle(s) or spray gun(s) near the supporting part notably of the compression roller (on entry). The roving(s) are circulated in this tank.

All the characteristics of the supporters, and in particular the compression rollers, the spreading, and the angle $\alpha_1$ causing the corner effect and detailed for the fluidized bed are also valid for spraying by spray gun.

According to other variants, two, three or more rollers can be present each having a spray gun.

First Step: Impregnation

The first step of impregnation to produce an impregnated fibrous material can be carried out according to techniques well known to the person skilled in the art and particularly chosen from those disclosed above.

Thus it can be carried out by the molten route, especially by pultrusion, by crosshead-die extrusion of molten polymer.

The impregnation step is in particular carried out by crosshead-die extrusion of the polymer matrix and passage of said roving(s) in this crosshead die, then passage in a heated die, the crosshead die optionally being provided with stationary or rotary supporters on which the roving passes, thus causing an spreading of said roving allowing a pre-impregnation of said roving.

The impregnation can in particular be carried out as described in US 2014/0005331A1, with the difference that supplying the resin is carried out on two sides of said roving and there is no contact surface eliminating a portion of the resin on one of the two surfaces.

Advantageously, the impregnation step is carried out by molten route at a high speed, that is with a passage speed of said roving(s) in particular at a speed of at least 1 to 10 m/min for the molten route, in particular of at least 2 m/min.

Second Step: Heating without Supporter and Drying of the Pre-Impregnated Fibrous Material As already noted above, this heating step without supporter makes it possible to dry the pre-impregnated roving, in particular by dispersion, suspension or emulsion, and to begin or finalize the impregnation based on the length of the furnace containing the heating system.

The heating system makes it possible to melt said thermoplastic polymer impregnating said fibrous material.

Said heating system is particularly an IR, microwave, high frequency or laser heating system, in particular IR heating system with a power of between 0.1 W and 10 kW, more preferably between 0.1 and 6 kW, more preferably between 0.1 and 3 kW, even more preferably between 0.6 and 3 kW, even more preferably between 0.6 and 1.8 kW.

Optional Third Step: Heating with Supporters of the Pre-Impregnated Fibrous Material and Finalizing the Impregnation.

The step of preimpregnation can therefore be carried out by any means provided or not with at least one supporter (E').

The presence of the supporter allows the spreading of the roving and improves the preimpregnation. However, the presence of this supporter is not indispensable as long as a heating system provided with at least one supporting part (E) is present after the pre-impregnation step to finalize the impregnation.

The expression "supporting part (E)" refers to any system on which the roving can pass. The supporting part (E) can have any shape as long as the roving can pass over it. It can be stationary or rotating.

The heating system is any system giving off heat or emitting radiation capable of heating the supporting part (E).

It can be chosen from an infrared lamp, a UV lamp, convection heating, microwave heating, laser heating and high frequency (HF) heating.

The heating system makes it possible to melt said thermoplastic polymer impregnating said fibrous material.

Said heating system is particularly an IR, microwave, high frequency or laser heating system, in particular IR heating system with a power of between 0.1 W and 10 kW, more preferably between 0.1 and 6 kW, more preferably between 0.1 and 3 kW, even more preferably between 0.6 and 3 kW, even more preferably between 0.6 and 1.8 kW.

The supporting part (E) is therefore conductive or absorbs the radiation emitted by the heat.

The expression "heat-conducting supporting part (E)" means that the supporting part (E) consists of a material capable of absorbing and conducting heat.

It can also be a heating system using high frequency waves, microwaves or laser.

In this case, the supporting part does not conduct heat or does not absorb the radiation emitted by the heat.

The expression "non-heat-conducting supporting part (E)" means that the supporting part (E) consists of a material incapable of absorbing and conducting heat.

Said at least one supporting part (E) is located or comprised in the environment of the heating system, that is to say, it is not outside the heating system.

Advantageously, said heating system is mounted over said at least one supporting part (E). The heating system has a level sufficient so that the polymer present on the roving can melt but without breaking down said polymer.

Nevertheless, said heating system comprises either only said at least one supporting part (E), or may also comprise a portion of the roving, outside said supporting system (E), said roving portion being located before and/or after said supporting system (E).

The height between the heating system and the supporters is between 1 and 100 cm, preferably from 2 to 30 cm, and in particular from 2 to 10 cm.

It would not be outside the scope of the invention if the supporting part (E) was positioned in a furnace including a heating system, for example an IR heating system, but said supporting part was not positioned exactly below the heating elements, for example IR heating elements. It would not be outside the scope of the invention if the furnace included a convection heating mode and an IR heating system.

It would also not be outside the scope of the invention if said supporting part (E) placed in this furnace or in the environment of this furnace was equipped with an autonomous heating means such as a resistance making it possible to heat said supporting part (E), independently for example of the radiation from the IR lamps and the natural convection of the furnace and, in light of the speed of the line, the polymer present in the ribbons or the rovings was also in the molten state when it arrives in contact with said supporting part.

The height between the heating system and the supporters is between 1 and 100 cm, preferably from 2 to 30 cm, and in particular from 2 to 10 cm.

It is obvious that a second heating system can be present below the supporters, thus allowing uniform melting of said polymer on the two surfaces of the roving.

The heating system can be a horizontal system. However, the heating system(s) can be positioned vertically also with vertical passage of the roving through the supporters.

As a result, this heating step makes it possible to perfect the impregnation of the roving carried out beforehand during the pre-impregnation step, and in particular to obtain a homogeneous impregnation to the core.

Indeed, whatever the system used for the preimpregnation step, a first spreading occurs during that step, in particular if the preimpregnation step is carried out with the use of supporting parts (E'), such as in a fluidized bed with at least one supporter as described above.

A first spreading of the roving occurs at said compression rollers corresponding to the supporting parts (E') with "corner effect" due to the partial or complete passage of said roving over said supporting part(s) (E') and a second spreading occurs during the heating step, at said compression rollers corresponding to the supporting parts (E) due to the partial or complete passage of said roving over said supporting part(s) (E).

The heating system can be divided into two and therefore consist of two heating systems, a first heating system before said supporting parts (E) and a second heating system comprising said supporting parts. It is quite obvious that the distance between the two heating systems is then sufficient for the polymer to remain in the molten state.

The two heating systems may be of the same nature or of different nature and of identical or different power.

This second spreading is preceded during the passage of the roving in the heating system, before partial or full passage thereof over said supporter(s) (E), by the shrinkage of the roving because of the melting of the polymer on said roving.

This second spreading combined with the melting of said polymer matrix by the heating system and the retraction of the roving, make it possible to homogenize the pre-impregnation and thus to finalize the impregnation and to thus have an impregnation to the core and to have a high fiber content by volume, particularly constant in at least 70% of the volume of the ribbon, particularly in at least 80% of the volume of the ribbon, in particular in at least 90% of the volume of the ribbon, more particularly in at least 95% of the volume of the ribbon, as well as to decrease the porosity.

Advantageously, the spreading percentage during the heating step between the inlet of the first compression roller $R'_1$ and the outlet of the last compression roller $R'_1$ is about 0 to 300%, in particular 0 to 50%.

The various spreadings during the heating step combined with the melting of the thermoplastic polymer and the shrinkage of the roving during said heating step make it possible to produce an impregnated fiber content after the heating step between 45% to 65% by volume, preferably from 50 to 60% by volume, particularly from 54 to 60% (fiber content which cannot be reached by conventional techniques by molten route), where the fiber content by volume and the distribution of fibers is substantially identical on average on either side of the median plane of the fibrous material over the full length of said fibrous material thus leading to obtaining a notably single-layer fibrous material.

Below 45% fibers, the reinforcement is not of interest regarding the mechanical properties.

Above 65%, the limitations of the method are reached and the mechanical properties are lost again.

Advantageously, the porosity level in said impregnated fibrous material is less than 10%, in particular less than 5%, particularly less than 2%.

Shaping and Calibrating Step: Obtaining the Thin Band

A step of shaping the roving or said parallel rovings and of calibrating said impregnated fibrous material can be carried out after leaving the second heating system.

This step can be carried out directly after leaving the second heating system and, in this case, the running speed of the roving is identical in the second and third heating systems or is delayed, which means that the running speed of the roving can be different between the second and third heating systems.

This step can be carried out according to one of the following embodiments:

1) passing a band after impregnation over one or more supporters (as defined for (E)) of which at least one supporter is notched (grooved), the average width of said strip being less than the notched (or grooved) supporter.

At least one of said supporters is located under a third heating system, particularly IR, microwave, high frequency or laser heating system, in particular IR heating system with a power (for each ribbon or stack of parallel ribbons) of between 0.1 W and 10 kW, more preferably between 0.1 and 6 kW, more preferably between 0.1 and 3 kW, even more preferably between 0.6 and 3 kW, even more preferably between 0.6 and 1.8 kW. Advantageously, said at least one notched roller (41) is located first and is outside the third heating system (45). Advantageously, a second notched supporter (44) is present at the exit and outside the third heating system.

The passage over the non-notched supporters (42) and (43) makes it possible to re-expand the strip to the width of the notched supporter.

The diameter of the notched supporter or supporters (41) and (44) is between 12 mm and 50 mm, in particular between 12 mm and 30 mm.

The diameter of the non-notched supporter or supporters (42) and (43) is between 10 mm and 50 mm, in particular between 10 mm and 30 mm.

After passing under the third heating system, the band, shaped to the width of the notched supporter at the exit of the third heating system, passes at the level of the heating calenders (46) mounted in series and equipped with an IR system of 1 kW each and whose power delivered is variable, outside the third heating system, to obtain the calibrated thin band.

2) passing a band over one or more supporters (as defined for (E)) of which at least one supporter is notched (grooved), the average width of said band being greater than the notched (or grooved) supporter.

Said supporters are located under a third heating system, particularly IR, microwave high frequency or laser heating system, in particular IR heating system with a power (for each ribbon or stack of parallel ribbons) of between 0.1 W and 10 kW, more preferably between 0.1 and 6 kW, more preferably between 0.1 and 3 kW, even more preferably between 0.6 and 3 kW, even more preferably between 0.6 and 1.8 kW.

Advantageously, said at least one notched roller is located first.

The passage over the first notched supporter makes it possible to reduce the width of the strip below the width of the notched groove. Advantageously, a second notched supporter is present at the exit and outside the third heating system with a groove of width greater than the width of the strip.

After passing under the third heating system, the strip shaped to the width of the notched supporter at the exit of the third heating system, passes at the level of heating calenders mounted in series and equipped with an IR system of 1 kW, outside the third heating system, to obtain the calibrated thin band.

A calendering system with pressure and roll gap managed as disclosed in WO 2015/121583 can be used in both these embodiments.

The supporter is in particular a fixed or rotary notched roller, or even a counter-rotating roller, in particular a fixed roller for gathering the said impregnated fibrous material to the right width.

The notched roller may also have rounded edges at the lateral contact points with the supporter to avoid damaging the fibers at the edge of the thin band.

The expression "rounded edges" means that the bottom of the notch is concave or convex in shape.

Advantageously, the first embodiment of the shaping and calibrating step is preferred.

This therefore makes it possible to work with high travel speeds and thus reduce the production costs.

According to another aspect, the present invention relates to the use of an impregnated fibrous material, such as defined above, for the preparation of ribbons suitable for the manufacture of three-dimensional composite parts by automatic application of said ribbons by means of a robot.

All the characteristics defined hereinbefore for the fibrous material are also valid for said use.

According to another aspect, the present invention relates to the use of an impregnated fibrous material, as defined above, for the preparation of thermoformable sheets.

All the characteristics defined hereinbefore for the fibrous material are also valid for said use.

Advantageously, the impregnated fibrous material used hereinbefore is pre-cutt into pieces, said pieces being randomly associated or oriented for the preparation of the thermoformable sheet.

Thermoforming is carried out beyond the Tg for an amorphous thermoplastic polymer or between the Tg and the Tm for a semi-crystalline thermoplastic polymer, but it can also be carried out beyond the Tm of the semi-crystalline thermoplastic polymer.

The impregnated fibrous material is pre-slit into pieces having a width equal to the initial width of said fibrous material and a length of between 5 and 50 mm, in particular between 20 and 30 mm, said pieces being randomly associated or oriented for the preparation of the thermoformable sheet.

According to another aspect, the present invention relates to the use of at least one nonreactive thermoplastic polymer, said at least one nonreactive thermoplastic polymer being an amorphous or semi-crystalline thermoplastic polymer whose glass transition temperature is such that $Tg \geq 40°$ C., particularly $Tg \geq 100°$ C., in particular $\geq 120°$ C., said thermoplastic polymer having the number-average molecular mass Mn of said thermoplastic polymer from 11,000 to 25,000 g/mol, the molten viscosity of said thermoplastic polymer being from 80 to 1500 Pa·s, as measured by plane-plane rheology at 1 Hz and 2% deformation, at a temperature of $Tg+220°$ C., as defined hereinbefore, to impregnate a fibrous material.

All the characteristics defined hereinbefore for the fibrous material are also valid for said use.

Advantageous Embodiments of the Inventive Method

Advantageously, the fibrous material is chosen from carbon fiber rovings in particular greater than or equal to 12K, in particular chosen from 12K, 24K, 48K, 50K and 400K, particularly 12K, 24K, 48K and 50K, and glass fibers in particular whose grammage is greater than or equal to 1,200 Tex, particularly greater than or equal to 2,400 Tex, greater than or equal to 4,800 Tex.

Advantageously, the thermoplastic prepolymer used to impregnate the carbon fiber is chosen from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, PEEK and a PEI, or a mixture thereof.

Advantageously, the thermoplastic prepolymer used for impregnating the glass fiber is chosen from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material comprises carbon fiber rovings greater than or equal to 12K, in particular chosen from 12K, 24K, 48K, 50K and 400K, particularly 12K, 24K, 48K and 50K, and the thermoplastic polymer used for pre-impregnating the carbon fiber is chosen from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material is composed of carbon fiber rovings greater than or equal to 12K, in particular chosen from 12K, 24K, 48K, 50K and 400K, particularly 12K, 24K, 48K and 50K, and the thermoplastic polymer used for pre-impregnating the carbon fiber is chosen from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

Advantageously, the fibrous material comprises glass fiber rovings whose grammage is greater than or equal to 1,200 Tex, particularly greater than or equal to 2,400 Tex, greater than or equal to 4,800 Tex, and the thermoplastic polymer used for pre-impregnating the glass fiber is chosen from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PE, or a mixture thereof.

Advantageously, the fibrous material consists of glass fiber rovings whose grammage is greater than or equal to 1,200 Tex, particularly greater than or equal to 2,400 Tex, greater than or equal to 4,800 Tex and the thermoplastic polymer used for pre-impregnating the glass fiber is chosen from a polyamide, particularly an aliphatic polyamide such as PA 11, PA 12, a PA 11/1010 and a PA 12/1010, a semi-aromatic polyamide, in particular a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEKK, a PEEK and a PEI, or a mixture thereof.

BRIEF DESCRIPTION OF THE FIGURES

FIG. 1 shows the morphology of a composite plate which is microcracked but perfectly impregnated, obtained from a 11/10T/6T polymer of excessively low molecular mass Mn=10,500 g/mol, with a molten viscosity (plane/plane rheology at 1 Hz and 2% deformation) of 70 Pa·s at 330° C.

The scale bar represents 50 µm.

FIG. 2 shows the morphology of the same microcracked composite plate as FIG. 1, but with a greater magnification.

The scale bar represents 20 µm.

FIG. 3 shows the morphology of a composite plate having areas of dry fibers obtained from a 11/10T/6T polymer of excessively high molecular mass Mn=27,200 g/mol and with a molten viscosity (plane-plane rheology at 1 Hz and 2% deformation) of 1790 Pa·s at 330° C.

The scale bar represents 100 µm.

FIG. 4 shows the morphology of the same composite plate with dry areas as FIG. 3, but with a greater magnification.

The scale bar represents 20 µm.

FIG. 5 shows the morphology of a composite plate not having any microcracks or dry areas obtained from a 11/10T/6T polymer with molecular mass Mn=13,700 g/mol and with a molten viscosity (plane-plane rheology at 1 Hz and 2% deformation at Tg+220° C.) of 185 Pa·s at 330° C., attesting that the molecular mass of the polymer is optimal.

The scale bar represents 200 µm.

FIG. 6 shows the morphology of the same composite plate with no microcracks or dry areas like FIG. 5, but with a greater magnification.

The scale bar represents 20 µm.

EXAMPLES

The following examples provide a non-limiting illustration of the scope of the invention.

Example 1 (Comparative Example)

Impregnation of a fibrous material with a PA of type 11/10T/6T, with Tg 110° C. with mass Mn=10,500 g/mol, with molten viscosity (plane/plane rheology at 1 Hz and 2% deformation) of 70 Pa·s at 330° C.

This polymer is ground into powder with an average diameter D50=110 µm, then the powder is deposited by gravity on the surface of an Advantex SE4535 glass fiber reinforcement of 3B, woven in the form of a UDT (UD tape) of 400 g/m²: this type of reinforcement is a quasi-UD (unidirectional fibers), since 90% of the fibers are in the weft direction.

The assembly is heated by infrared heating to fix the powder.

The powder level is 30% by weight (or 50% by volume).

The prepreg thus obtained is cut into 300*200 mm formats, and 4 of these formats are superimposed to make up a preform which will next be consolidated by CARVER press at 330° C. for 15 min, then cooled and removed from the mold at 100° C.

Bending test specimens are taken in the minority direction of the fibers (90° orientation) tested according to standard 14125 (1998).

The results are provided in Table I below. The rupture stress value of 40 MPa in bending obtained with the mass of 10,500 is considered to be insufficient to protect against the presence of a premature microcrack of the composite at the interface of the fibers and resin, in the presence of a mechanical or thermal load.

This result is obtained despite a perfect impregnation of the fibers, but the presence of microcracks can be observed in the plates (see FIG. 1), which appear upon cooling under the effect of thermal stresses and affect the strength of the obtained composite: in this case, it is concluded that the polymer used has an insufficient molecular mass.

Example 2 (Comparative Example)

Impregnation of a fibrous material with a PA of type 11/10T/6T, with Tg 110° C. with mass Mn=27,200 g/mol, with molten viscosity (plane/plane rheology at 1 Hz and 2% deformation) of 1790 Pa·s at 330° C. according to Example 1.

The nature of the fibrous reinforcement, the method for manufacturing the prepreg, the composite plate and the mechanical test protocol are identical to those of Example 1.

The result obtained in transverse bending (90°) according to ISO 14125 (1998) is shown in Table I: it is close to that obtained with the polymer of low mass of Example 1; this attests this time that the mass of the polymer is too high and prevents good impregnation of the fibers, which is observed (see FIG. 2) through the presence of dry zones devoid of resin in the consolidated plate.

Since the Mn of the polymer is too high, it is therefore too viscous and its impregnation therefore leads to dry zones.

Example 3

Impregnation of a fibrous material with a PA of type 11/10T/6T, with Tg 110° C. with mass Mn=13,700 g/mol, with molten viscosity (plane/plane rheology at 1 Hz and 2% deformation at Tg+220° C.) is 185 Pa·s at 330° C.

The nature of the fibrous reinforcement, the method for manufacturing the prepreg, the composite plate and the mechanical test protocol are identical to those of Example 1.

A clear improvement of the transverse mechanical properties (90°) is observed according to ISO 14125 (1998) when the molecular mass of the resin goes from 10,500 to 13,700.

The morphology of the plates (see FIG. 3) shows that unlike comparative examples no. 1 and 2, no microcrack or dry zone are present in the plate, attesting that the molecular mass of the polymer is optimal.

Example 4

Impregnation of a fibrous material with a PA of type MPMDT/10T (67/33 mol %) with D50=115 µm, with Tg 125° C. Its mass is 14,000 g/mol (measurement by NMR) and its molten viscosity (plane/plane rheology at 1 Hz and 2% deformation at Tg+220° C.) is 214 Pa·s at 345° C.

This polymer is ground into powder with an average diameter D50=115 μm. The powder is supplemented with dry blend with a heat stabilizing agent, then deposited according to Example 1 on the surface of an Advantex glass reinforcing fiber of 3B, SE4535 woven in the form of a UDT (90% of the fibers are in the weft direction and 10% and the warp direction) of 400 g/m². The powder level is 30% by weight (or 50% by volume).

The prepreg thus obtained is cut into 300*200 mm formats, and 4 of these formats are superimposed to make up a preform which will next be consolidated by CARVER press at 345° C. for 15 min, then cooled and removed from the mold at 100° C.

Bending test specimens are taken in the majority direction of the fibers (weft direction) tested according to standard ISO 14125 (1998).

The results are provided in Table I below.

It is observed that the molecular mass molten viscosity compromise is satisfactory.

Example 5

Impregnation of a fibrous material with a PA of type BACT/10T with Tg 140° C. Its mass is 19,100 g/mol (measurement by NMR) and its molten viscosity (plane-plane rheology at 1 Hz and 2% deformation at Tg+220° C.) is 502 Pa·s at 360° C.

This polymer is ground into powder with an average diameter DN50=110 μm. The powder is supplemented with dry blend with a heat stabilizing agent, then deposited according to Example 1 on the surface of an Advantex glass reinforcing fiber of 3B, SE4535 woven in the form of a UDT (90% of the fibers are in the weft direction and 10% and the warp direction) of 400 g/m². The powder level is 30% by weight (or 50% by volume).

The prepreg thus obtained is cut into 300*200 mm formats, and 4 of these formats are superimposed to make up a preform which will next be consolidated by CARVER press at 360° C. for 15 min, then cooled and removed from the mold at 100° C.

Bending test specimens are taken in the majority direction of the fibers (weft direction) tested according to standard ISO 14125 (1998).

The results are provided in Table I below.

It is observed that the molecular mass molten viscosity compromise is satisfactory.

Example 6

The polymer is a MXD10 with mass 15,000 g/mol. Its Tg is 70° C. and its viscosity at 290° C. is 110 Pa·s.

The method for manufacturing the composite plate is a pultrusion method with impregnation by molten route with a crosshead die. The polymer is introduced in the form of granules, compounded beforehand with a heat stabilizing agent, in an extruder which supplies the crosshead die.

The temperature at which the fibers have been impregnated was 290° C.

The line speed was 1.1 m/min pb/claimed speed range.

The fiber used is the Hypertex glass fiber of 3B SE4535.

The fiber level was 60% by volume.

Excellent mechanical properties are obtained, measured in bending according to standard ISO 14125 (1998). They are summarized in Table I below:

In this example, unlike in the other examples, no break is observed in transverse bending, up to 10% deformation, past which value the test is interrupted because it then goes beyond the conditions recommended by standard ISO 14125. In this case, the excellence of the transverse mechanical properties is judged by the ductility of the obtained composite (that is to say, the value of the deformation achieved perpendicular to the fibers (90° direction)), which attests to a good compromise between molten viscosity and molecular mass.

TABLE 1

| Example no. | Mn | Tg (° C.) | Molten viscosity (Pa · s) at Tg + 220° C. | Modulus 90° (GPa) | Stress 90° (MPa) |
|---|---|---|---|---|---|
| 1 | 10,500 | 110 | 70 | 7.7 | 41 |
| 2 | 27,200 | 110 | 1790 | 3.6 | 46 |
| 3 | 13,700 | 110 | 185 | 10.2 | 79 |
| 4 | 14,000 | 125 | 214 | 9.2 | 75 |
| 5 | 19,100 | 140 | 502 | 10.3 | 82 |
| 6 | 15,000 | 70 | 110 | 5.8 | 47** |

**no break observed in transverse bending up to 10% deformation.

All of Examples 1 to 5 led to breaking.

Example 6 therefore corresponds to a material which deforms greatly without breaking.

Example 7: Determination of the Porosity Level the Relative Deviation Between Theoretical Density and Experimental Density (General Method)

a) The required data are:
  The density of the thermoplastic matrix
  The density of the fibers
  The grammage of the reinforcement:
linear mass (g/m) for example for a ¼ inch band (coming from a single roving) surface density (g/m²) for example for a wider band or a fabric
b) Measurements to be carried out:
  The number of samples must be at least 30 in order for the result to be representative of the studied material.
  The measurements to be carried out are:
  The size of the samples taken:
Length (if linear mass is known).
Length and width (if surface density is known).
  The experimental density of the samples taken:
Mass measurements in the air and in water.
  The fiber level is measured according to ISO 1172:1999 or by thermogravimetric analysis (TGA) as determined for example in the document B. Benzler, Applikationslabor, Mettler Toledo, Giesen, UserCom 1/2001.
  The measurement of the carbon fiber level can be determined according to ISO 14127:2008.
  Determination of the theoretical mass fiber level:
a) Determination of the Theoretical Mass Fiber Level:

$$\% \, Mf_{th} = \frac{m_l \cdot L}{Me_{air}}$$

With
$m_l$ the linear mass of the tape,
L the length of the sample, and
$Me_{air}$ the mass of the sample measured in the air.

The variation of the mass fiber level is presumed to be directly related to a variation of the matrix level without taking into account the variation of the quantity of fibers in the reinforcement.

b) Determination of the Theoretical Density:

$$d_{th} = \frac{1}{\frac{1 - \% \, Mf_{th}}{d_m} + \frac{\% \, Mf_{th}}{d_f}}$$

With $d_m$ and $d_f$ the respective densities of the matrix and the fibers.

The theoretical density thus calculated is the accessible density if there is no porosity in the samples.

c) Evaluation of the Porosity:

The porosity then is the relative deviation between theoretical density and experimental density.

The invention claimed is:

1. An impregnated fibrous material comprising at least one continuous-fiber fibrous material in the form of a roving or several parallel rovings and at least one thermoplastic polymer matrix, wherein a thermoplastic polymer of said at least one thermoplastic polymer matrix is an amorphous or semi-crystalline polymer having a glass transition temperature such that Tg≥40° C., as measured using a differential scanning calorimeter (DSC), after a second heating pass, according to standard ISO 11357-2:2013, with a heating and cooling speed of 20° C./min, the fiber content in said impregnated fibrous material being from 45 to 65% by volume, the number-average molecular mass Mn of said thermoplastic polymer being from 11,000 to 25,000 g/mol, the melt viscosity of said thermoplastic polymer being from 80 to 1500 Pa·s, as measured by plane/plane rheology at 1 Hz and 2% deformation, at a temperature of Tg+220° C., wherein the content of fibers by volume is constant in at least 70% of the volume of the impregnated fibrous material.

2. The impregnated fibrous material according to claim 1, wherein the polymolecularity index Ip of said thermoplastic polymer is from 2 to 6.

3. The impregnated fibrous material according to claim 1, wherein said at least thermoplastic polymer is chosen from: polyaryl ether ketones (PAEK); polyaryl ether ketone ketone (PAEKK); aromatic polyether imides (PEI); polyaryl sulfones; polyarylsulfides; polyamides (PA); PEBAs; polyolefins, polylactic acid (PLA), polyvinyl alcohol (PVA), and fluorinated polymers; and mixtures thereof.

4. The impregnated fibrous material according to claim 1, wherein the number-average molecular mass Mn of said thermoplastic polymer is from 14,000 to 25,000, and the molten viscosity of said thermoplastic polymer is from 150 to 1500 Pa·s at a temperature of Tg+220° C., and said thermoplastic polymer is a polymer with Tg≥130° C.

5. The impregnated fibrous material according to claim 4, wherein said at least thermoplastic polymer is a polyamide.

6. The impregnated fibrous material according to claim 5, wherein said polyamide is chosen from semi-aromatic polyamides.

7. The fibrous material according to claim 6, wherein said semi-aromatic polyamide is optionally modified with urea units and chosen from a semi-aromatic polyamide of formula X/YAr, wherein:

Y denotes the residues of an aliphatic diamine having 8 to 20 carbon atoms,

Ar denotes the residues an aromatic dicarboxylic acid group,

X denotes the residues of the $NH_2-(CH_2)_{10}-COOH$ aminoundecanoic acid, the lactam 12 or the corresponding amino acid, or the Y,x pattern group from the condensation of the diamine with a dialiphatic acid (x) having between 8 and 20 carbon atoms or to the Y,I pattern group from the condensation of the diamine with isophthalic acid.

8. The impregnated fibrous material according to claim 6, wherein said semi-aromatic polyamide is chosen from a PA MXDT/6T, a PA MPMDT/6T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, a PA 11/MPMDT/6T, PA 11/BACT/10T, a PA 11/MXDT/10T, a PA 11/MXDT/6T.

9. The impregnated fibrous material according to claim 1, wherein the number-average molecular mass Mn of said thermoplastic polymer is from 11,000 to 20,000 g/mol, the molten viscosity of said thermoplastic polymer is from 80 to 650 Pa·s at a temperature of Tg+220° C., and said thermoplastic polymer is a polyamide with Tg<130° C.

10. The impregnated fibrous material according to claim 9, wherein said polyamide with Tg<130° C. is chosen from aliphatic polyamides, cycloaliphatic polyamides and semi-aromatic polyamides with Tg less than 130° C.

11. The impregnated fibrous material according to claim 10, wherein said aliphatic polyamide is chosen among polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, polyamide 12/1010, or a mixture thereof or a copolyamide thereof, and block copolymers, and the semi-aromatic polyamides are chosen among MXD10, MXD6, PA 6/6T, a PA 66/6T, a PA 61/6T, MPMDT/10T, 11/MPMDT/10T, MPMDT/6T, a PA BACT/10T, a PA 11/BACT/10T, a MXDT/10 and a PA 11/MXDT/10T.

12. The impregnated fibrous material according to claim 1, wherein the number of fibers in said fibrous material for carbon fibers is greater than or equal to 3K, or the grammage for the glass fiber is greater than or equal to 1,200 Tex.

13. The impregnated fibrous material according to claim 1, wherein the fibers of the fibrous material are non-sized.

14. The impregnated fibrous material according to claim 1, wherein the material has a porosity level, that is the closed porosity level determined by electron microscopy or relative deviation between theoretical density and experimental density, in said impregnated fibrous material of less than 10%.

15. The impregnated fibrous material according to claim 1, wherein said impregnated fibrous material is single layer.

16. The impregnated fibrous material according to claim 1, wherein said fibrous material comprises continuous fibers selected from carbon, glass, silicon carbide, basalt, silica, natural fibers or amorphous thermoplastic fibers with a glass transition temperature Tg higher than the Tg of said polymer or said polymer mixture when the latter is amorphous or higher than the Tm of said polymer or said polymer mixture when the latter is semi-crystalline, or the semi-crystalline thermoplastic fibers with a melting temperature Tm higher than the Tg of said polymer or said polymer mixture when the latter is amorphous or higher than the Tm of said polymer or said polymer mixture when the latter is semi-crystalline, or a mixture of two or several of said fibers.

17. The impregnated fibrous material according to claim 1, wherein said thermoplastic polymer further comprises carbonaceous fillers.

18. The impregnated fibrous material according to claim 1, wherein said thermoplastic pre-polymer further comprises liquid crystal polymers or cyclic poly(butylene terephthalate), or mixtures containing said liquid crystal polymers or said cyclic poly(butylene terephthalate) as additives.

19. The impregnated fibrous material according to claim 1, wherein said impregnated fibrous material does not exhibit drapability.

20. A method for preparing an impregnated fibrous material as defined in claim 1, wherein it comprises a step of pre-impregnating or a step of impregnating said fibrous material with at least thermoplastic polymer being an amorphous or semi-crystalline polymer having a glass transition temperature such that Tg≥40° C., the fiber content in said impregnated fibrous material being from 45 to 65% by volume, the number-average molecular mass Mn of said thermoplastic polymer being from 11,000 to 25,000 g/mol, the melt viscosity of said thermoplastic polymer being from 80 to 1500 Pa·s, as measured by plane/plane rheology at 1 Hz and 2% deformation, at a temperature of Tg+220° C.

21. The method for preparing an impregnated fibrous material according to claim 20, wherein it comprises a step of impregnating said fibrous material with at least thermoplastic polymer, the number-average molecular mass Mn of said thermoplastic polymer being from 11,000 to 20,000 g/mol, the molten viscosity of said thermoplastic polymer is from 80 to 650 Pa·s at a temperature of Tg+220° C., and said thermoplastic polymer being a polyamide with Tg<130° C.

22. The method according to claim 21, wherein said impregnation step is carried out by molten route, at a speed >1m/min.

23. The method according to claim 21, wherein it comprises the following steps:
i) impregnating a fibrous material with at least one nonreactive thermoplastic polymer by molten route, by crosshead-die extrusion of molten polymer, in order to obtain an impregnated fibrous material, said pre-impregnation step being carried out by at least thermoplastic polymer, the number-average molecular mass Mn of said thermoplastic polymer being from 11,000 to 20,000 g/mol, the molten viscosity of said thermoplastic polymer is from 80 to 650 Pa·s at a temperature of Tg+220° C., and said thermoplastic polymer being a polymer with Tg<130° C.
i) optionally a step of shaping and calibrating said impregnated fibrous material to obtain an impregnated fibrous material consisting of a ribbon in the form of a thin band having a thickness from 0.2 to 5 mm.

24. The method for preparing an impregnated fibrous material according to claim 20, wherein it comprises a step of pre-impregnating said fibrous material assuming the form of a roving or of several parallel rovings with at least one nonreactive thermoplastic polymer, the number-average molecular mass Mn of said thermoplastic polymer is from 14,000 to 25,000 and the molten viscosity of said thermoplastic polymer is from 150 to 1500 Pa·s at a temperature of Tg+220° C., and said thermoplastic polymer is a polymer with Tg≥130° C.

25. The method according to claim 24, wherein said pre-impregnation is carried out with a system chosen among a fluidized bed, spraying by spray gun, by continuous passage of the fibers in an aqueous dispersion of powder of said nonreactive thermoplastic polymer or aqueous dispersion of particles of said thermoplastic polymer or emulsion or aqueous suspension of said nonreactive thermoplastic polymer.

26. The method according to claim 24, wherein it comprises at least one heating step without supporter of said pre-impregnated fibrous material.

27. The method according to claim 26, wherein the heating system is chosen from an infrared lamp, a UV lamp, a convection heating, a microwave heating, a laser heating and a high frequency (HF) heating.

28. The method according to claim 24, wherein it comprises at least one heating step carried out by means of at least a supporting part (E) and at least one heating system, said roving(s) being in contact with part or all of the surface of said at least one supporting part (E) and scrolling partially or wholly on the surface of said at least one supporting part (E) at the heating system.

29. The method according to claim 24, wherein it comprises the following steps:
i) Pre-impregnating a fibrous material with at least one nonreactive thermoplastic polymer by fluidized bed in a tank, equipped or not with at least one supporting part (E'), by spraying by nozzle or spray gun by dry route in a tank, equipped or not with at least one supporting part (E') to obtain a pre-impregnated fibrous material, said pre-impregnation step being carried out by at least one nonreactive thermoplastic polymer, the number-average molecular mass Mn of said thermoplastic polymer is from 14,000 to 25,000, and the molten viscosity of said thermoplastic polymer is from 150 to 1500 Pa·s at a temperature of Tg+220° C. and said thermoplastic polymer is a polymer with Tg≥130° C.,
ii) heating step without support of said pre-impregnated fibrous material to obtain a pre-impregnated fibrous material,
iii) heating step carried out using at least one supporting part (E) and at least one heating system, as defined in claim 28 or 27, to obtain an impregnated fibrous material,
iv) optionally, step of shaping and calibrating the roving or said parallel rovings of said impregnated fibrous material to obtain an impregnated fibrous material consisting of a ribbon in the form of a thin band.

30. The method according to claim 24, wherein it comprises the following steps:
i) pre-impregnating a fibrous material with at least one nonreactive thermoplastic polymer, said pre-impregnation step being carried out by at least thermoplastic polymer and said thermoplastic polymer is a polymer with Tg≥130° C., said nonreactive thermoplastic polymer having a number-average molecular mass Mn of said thermoplastic polymer from 14,000 to 25,000 and the molten viscosity of said thermoplastic polymer is from 150 to 1500 Pa·s, as measured in plane/plane rheology at 1 Hz and 2% deformation, at a temperature of Tg+220° C.,
ii) heating step without support of said pre-impregnated fibrous material to obtain an impregnated fibrous material,
iii) optionally, heating step carried out using at least one supporting part (E) and at least one heating system to obtain an impregnated fibrous material,
iv) optionally, step of shaping and calibrating the roving or said parallel rovings of said impregnated fibrous material to obtain an impregnated fibrous material consisting of a ribbon in the form of a thin band.

31. The method according to claim 20, wherein one or more supporter(s) (E") is (are) present upstream from said system.

32. The method according to claim 24, wherein it is carried out for the dry powder route at a speed from 5 to 30 m/min and for the aqueous dispersion route at a speed of at least 15 m/min.

33. A method for the preparation of ribbons suitable for the manufacture of three-dimensional composite parts, by the automatic laying of said ribbons by means of a robot, wherein the ribbons comprise the impregnated fibrous material according to claim 1.

34. The method for the preparation of thermoformable sheets, wherein the thermoformable sheets comprise the impregnated fibrous material according to claim 1.

35. The method according to claim 34, wherein the impregnated fibrous material is pre-cut into pieces, said pieces being randomly associated or oriented for the preparation of the thermoformable sheet.

36. A method for impregnating a fibrous material, the method comprising impregnating a fibrous material with at least one nonreactive thermoplastic polymer, said at least one nonreactive thermoplastic polymer being an amorphous or semi-crystalline thermoplastic polymer having a glass transition temperature such that Tg≥40° C., the fiber content in said impregnated fibrous material being from 45 to 65% by volume, the number-average molecular mass Mn of said thermoplastic polymer being from 11,000 to 25,000 g/mol, the molten viscosity of said thermoplastic polymer being from 80 to 1500 Pa·s, as measured by plane/plane rheology at 1 Hz and 2% deformation, at a temperature of Tg+220° C., as defined in claim 1.

37. An impregnated fibrous material comprising at least one continuous-fiber fibrous material in the form of a roving or several parallel rovings and at least one thermoplastic polymer matrix, wherein a thermoplastic polymer of said at least one thermoplastic polymer matrix is an amorphous or semi-crystalline polymer having a glass transition temperature such that Tg≥40° C., as measured using a differential scanning calorimeter (DSC), after a second heating pass, according to standard ISO 11357-2:2013, with a heating and cooling speed of 20° C./min, the fiber content in said impregnated fibrous material being from 45 to 65% by volume, the number-average molecular mass Mn of said thermoplastic polymer being from 11,000 to 25,000 g/mol, the melt viscosity of said thermoplastic polymer being from 80 to 1500 Pa·s, as measured by plane/plane rheology at 1 Hz and 2% deformation, at a temperature of Tg+220° C.; and wherein said thermoplastic polymer is an aliphatic polyamide chosen from: polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 1 1/1010 and polyamide 12/1010, or a mixture thereof or a copolyamide thereof, and block copolymers.

* * * * *